(12) United States Patent
Schlintz

(10) Patent No.: US 12,297,062 B1
(45) Date of Patent: May 13, 2025

(54) SYSTEM AND METHOD FOR RESTRAINING A VEHICLE PROXIMATE A LOADING DOCK

(71) Applicant: Systems, LLC, Germantown, WI (US)

(72) Inventor: John Schlintz, Mequon, WI (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 726 days.

(21) Appl. No.: 17/480,620

(22) Filed: Sep. 21, 2021

Related U.S. Application Data

(60) Provisional application No. 63/081,275, filed on Sep. 21, 2020.

(51) Int. Cl.
  *B60T 3/00* (2006.01)
  *B65G 69/00* (2006.01)

(52) U.S. Cl.
  CPC ...... *B65G 69/005* (2013.01); *B65G 2203/042* (2013.01)

(58) Field of Classification Search
  CPC ... B65G 69/005; B65G 2203/042; B60T 3/00; B60P 3/077
  See application file for complete search history.

(56) References Cited

U.S. PATENT DOCUMENTS

| 1,915,320 | A | 6/1933 | Jones |
|---|---|---|---|
| 3,557,909 | A | 1/1971 | Neumann |
| 3,993,167 | A | 11/1976 | Reed |
| 4,911,270 | A | 3/1990 | Hudson |
| 5,047,748 | A | 9/1991 | Trickle |
| 5,137,121 | A | 8/1992 | Leonard |
| 5,158,158 | A | 10/1992 | Balogh |
| 5,168,267 | A | 12/1992 | Trickle |
| 5,249,905 | A | 10/1993 | Warner |
| 5,263,553 | A | 11/1993 | Duncan |
| 5,294,221 | A | 3/1994 | Eller |
| 5,312,213 | A | 5/1994 | Winsor |
| 5,368,134 | A | 11/1994 | Rickman |

(Continued)

FOREIGN PATENT DOCUMENTS

| CA | 2164738 | 6/1997 |
|---|---|---|
| EP | 2944522 | 11/2015 |

OTHER PUBLICATIONS

Blue Giant Interlock Chock Owner's Manual; 36 pages; Issue Date: Mar. 23, 2021 REV.12 (Part#038-1225E).

(Continued)

*Primary Examiner* — Thomas W Irvin
(74) *Attorney, Agent, or Firm* — Dority & Manning, P.A.

(57) ABSTRACT

In one aspect, a wheel chock system is provided that includes a wheel chock with a sensor configured to detect a proximity of a wheel, and a controller operably coupled to the sensor and a peripheral device. The controller includes a processor configured to cause the peripheral device to have a first state in response to the sensor detecting the wheel within a first proximity. The processor is further configured to initiate a timer in response to the sensor detecting the wheel within a second proximity. The processor is further configured to cause the peripheral device to transition to a second state in response to the sensor detecting the wheel within the second proximity for a predetermined time period measured by the timer.

35 Claims, 15 Drawing Sheets

(56) References Cited

U.S. PATENT DOCUMENTS

| | | | |
|---|---|---|---|
| 5,375,442 A | 12/1994 | Hammer |
| 5,381,680 A | 1/1995 | Rauch, Jr. |
| 5,490,582 A | 2/1996 | Trowbridge |
| 5,547,045 A | 8/1996 | Stutzman |
| 5,553,987 A | 9/1996 | Ellis |
| 5,582,498 A | 12/1996 | Springer |
| 5,664,930 A | 9/1997 | Ellis |
| 5,709,518 A | 1/1998 | Alexander |
| 5,743,697 A | 4/1998 | Alexander |
| 5,762,459 A | 6/1998 | Springer |
| 5,833,034 A | 11/1998 | Banholzer |
| 5,887,462 A | 3/1999 | Stone |
| 5,896,957 A | 4/1999 | Berends |
| 5,901,816 A | 5/1999 | Camilleri |
| 5,913,389 A | 6/1999 | Clark |
| 5,927,443 A | 7/1999 | Collins, Jr. |
| 5,927,928 A | 7/1999 | Hageman |
| 5,934,857 A | 8/1999 | Alexander |
| 6,065,172 A | 5/2000 | Swessel |
| 6,070,283 A | 6/2000 | Hahn |
| 6,082,952 A | 7/2000 | Alexander |
| 6,085,375 A | 7/2000 | Holm |
| 6,092,970 A | 7/2000 | Hahn |
| 6,106,212 A | 8/2000 | Hahn |
| 6,116,839 A | 9/2000 | Bender |
| 6,123,496 A | 9/2000 | Alexander |
| 6,164,893 A | 12/2000 | Glomot |
| 6,190,109 B1 | 2/2001 | Bender |
| 6,250,432 B1 | 6/2001 | Hageman |
| 6,260,666 B1 | 7/2001 | Freeman |
| 6,276,496 B1 | 8/2001 | Hageman |
| 6,311,352 B1 | 11/2001 | Springer |
| 6,322,310 B1 | 11/2001 | Bender |
| 6,336,527 B1 | 1/2002 | Metz |
| RE37,570 E | 3/2002 | Springer et al. |
| 6,357,987 B1 | 3/2002 | Palus |
| 6,360,394 B1 | 3/2002 | Hahn |
| 6,368,043 B1 | 4/2002 | Leum |
| 6,371,253 B1 | 4/2002 | Berends |
| 6,378,956 B1 | 4/2002 | Van De Walker |
| 6,390,245 B1 | 5/2002 | Metz |
| 6,425,465 B1 | 7/2002 | Tallman |
| 6,467,586 B2 | 10/2002 | Agtuca |
| 6,478,525 B2 | 11/2002 | Hageman |
| 6,488,464 B1 | 12/2002 | Kish |
| 6,505,713 B1 | 1/2003 | Paul |
| 6,524,053 B2 | 2/2003 | Hahn |
| 6,585,211 B1 | 7/2003 | Hageman |
| 6,589,003 B2 | 7/2003 | Berends |
| 6,634,049 B2 | 10/2003 | Hahn |
| 6,676,360 B2 | 1/2004 | Springer |
| 6,725,979 B1 | 4/2004 | Snook |
| 6,726,432 B2 | 4/2004 | Kish |
| 6,752,381 B2 | 6/2004 | Colak |
| 6,755,599 B1 | 6/2004 | Plyler |
| 6,773,221 B2 | 8/2004 | Belongia |
| 6,832,403 B2 | 12/2004 | Hahn |
| 6,978,865 B2 | 12/2005 | Fougere |
| 7,032,267 B2 | 4/2006 | Mitchell |
| 7,032,720 B2 | 4/2006 | Jette |
| 7,036,637 B1 | 5/2006 | Wiens |
| 7,040,461 B2 | 5/2006 | Chrisco |
| 7,044,698 B2 | 5/2006 | Winsor |
| 7,062,814 B2 | 6/2006 | Bender |
| 7,146,673 B1 | 12/2006 | Digmann |
| 7,164,092 B2 | 1/2007 | Kawano |
| 7,185,744 B2 | 3/2007 | Barnett |
| 7,213,285 B2 | 5/2007 | Mitchell |
| 7,216,391 B2 | 5/2007 | Muhl |
| 7,226,265 B2 | 6/2007 | Wilson |
| 7,264,092 B2 | 9/2007 | Gaetan |
| 7,284,641 B1 | 10/2007 | Spence, III |
| 7,299,902 B2 | 11/2007 | Thorpe |
| 7,334,281 B2 | 2/2008 | Digmann |
| 7,363,670 B2 | 4/2008 | Mitchell |
| 7,380,305 B2 | 6/2008 | Muhl |
| 7,503,089 B2 | 3/2009 | Muhl |
| 7,513,725 B1 | 4/2009 | Bullock |
| 7,533,431 B2 | 5/2009 | Hochstein |
| 7,537,095 B2 | 5/2009 | Eriksson |
| 7,546,655 B2 | 6/2009 | Mitchell |
| 7,552,606 B2 | 6/2009 | Drummond |
| 7,584,517 B2 | 9/2009 | Digmann |
| 7,594,284 B2 | 9/2009 | Schuchardt |
| 7,681,271 B2 | 3/2010 | Muhl |
| 7,823,239 B2 | 11/2010 | Hochstein |
| 7,824,138 B2 | 11/2010 | Bullock |
| 7,841,823 B2 | 11/2010 | Sveum |
| 7,877,831 B2 | 2/2011 | Digmann |
| 7,914,042 B2 | 3/2011 | Andersen |
| 7,914,247 B2 | 3/2011 | Schuchardt |
| 7,999,680 B2 | 8/2011 | Penot |
| 8,006,811 B2 | 8/2011 | Andersen |
| 8,065,770 B2 | 11/2011 | Proffitt |
| 8,141,189 B2 | 3/2012 | Mitchell |
| 8,191,194 B2 | 6/2012 | Belongia |
| 8,286,757 B2 * | 10/2012 | Nelson ................. B65G 69/005 188/4 R |
| 8,287,223 B2 | 10/2012 | Andersen |
| 8,303,235 B2 | 11/2012 | Sander |
| 8,307,956 B2 * | 11/2012 | Andersen ............. B65G 69/005 188/4 R |
| 8,348,562 B2 | 1/2013 | Bullock |
| 8,443,474 B2 | 5/2013 | Sveum |
| 8,443,945 B2 | 5/2013 | Perkins |
| 8,464,384 B2 | 6/2013 | Belongia |
| 8,464,846 B2 | 6/2013 | Andersen |
| 8,465,245 B2 | 6/2013 | Manone |
| 8,497,761 B2 | 7/2013 | McNeill |
| 8,499,897 B2 | 8/2013 | Brooks |
| 8,499,899 B2 | 8/2013 | Scott |
| 8,544,130 B2 | 10/2013 | Sveum |
| 8,547,234 B2 | 10/2013 | Maly |
| 8,590,087 B2 | 11/2013 | Swessel |
| 8,590,673 B2 | 11/2013 | Andersen |
| 8,590,674 B2 | 11/2013 | Jette |
| 8,616,826 B2 | 12/2013 | Cotton |
| D696,927 S | 1/2014 | Wyers |
| 8,657,078 B2 | 2/2014 | Wolfram |
| 8,657,551 B2 | 2/2014 | Andersen |
| 8,662,535 B2 | 3/2014 | Andersen |
| 8,678,736 B2 | 3/2014 | Andersen |
| 8,690,501 B2 | 4/2014 | Bullock |
| 8,696,272 B1 | 4/2014 | Ragland |
| 8,789,850 B2 | 7/2014 | Kimener |
| 8,857,574 B2 | 10/2014 | De Jong |
| 8,869,948 B2 | 10/2014 | Saliger |
| 8,887,874 B2 | 11/2014 | Bellota |
| 8,905,198 B2 | 12/2014 | Brooks |
| 9,010,501 B2 | 4/2015 | Brooks |
| 9,096,170 B2 | 8/2015 | Swessel |
| 9,096,397 B2 | 8/2015 | Brooks |
| 9,126,775 B2 | 9/2015 | Brooks |
| 9,139,384 B2 | 9/2015 | Brooks, IV |
| 9,145,273 B2 | 9/2015 | Brooks |
| 9,150,367 B2 | 10/2015 | Brooks |
| 9,174,811 B2 | 11/2015 | Proffitt |
| 9,227,799 B2 | 1/2016 | Brooks |
| 9,230,419 B2 | 1/2016 | Beggs |
| D751,735 S | 3/2016 | Swessel |
| 9,481,531 B2 | 11/2016 | Stone |
| 9,499,897 B2 | 11/2016 | Jiang |
| D775,537 S | 1/2017 | Kikstra |
| 9,539,995 B2 | 1/2017 | Metz |
| 9,542,824 B2 | 1/2017 | Beggs |
| 9,546,056 B2 | 1/2017 | Stone |
| 9,547,969 B2 | 1/2017 | Beggs |
| D778,184 S | 2/2017 | Kikstra |
| 9,564,072 B2 | 2/2017 | Senfleben |
| 9,586,771 B2 | 3/2017 | Brooks |
| 9,607,496 B2 | 3/2017 | Beggs |
| 9,633,537 B2 | 4/2017 | Beggs |
| 9,672,713 B2 | 6/2017 | Beggs |
| 9,688,253 B1 | 6/2017 | Colby |

(56) References Cited

U.S. PATENT DOCUMENTS

| | | |
|---|---|---|
| 9,694,996 B2 | 7/2017 | Kikstra |
| 9,738,467 B2 | 8/2017 | Stone |
| 9,751,702 B1* | 9/2017 | Hoofard .................... B60T 3/00 |
| 9,771,225 B2 | 9/2017 | Stone |
| 9,776,511 B2 | 10/2017 | Brooks |
| 9,777,529 B2 | 10/2017 | McNeill |
| 9,790,038 B2 | 10/2017 | Kish |
| 9,845,209 B2 | 12/2017 | Stone |
| 9,896,282 B2 | 2/2018 | Boston |
| RE46,876 E | 5/2018 | Garceau |
| 10,081,504 B2 | 9/2018 | Walford |
| 10,113,352 B2 | 10/2018 | McNeill |
| 10,131,328 B2 | 11/2018 | Breakfield |
| 10,179,572 B2 | 1/2019 | Metz |
| 10,328,910 B2 | 6/2019 | Edgeworth |
| 10,329,105 B2 | 6/2019 | Hoofard |
| 10,358,112 B2 | 7/2019 | Fulcher |
| D857,602 S | 8/2019 | Sveum |
| 10,377,586 B2 | 8/2019 | Yule |
| 10,392,205 B2 | 8/2019 | Boston |
| 10,393,627 B2 | 8/2019 | Etches |
| D859,278 S | 9/2019 | White |
| D860,107 S | 9/2019 | Bilgin |
| 10,501,058 B2 | 12/2019 | Rancourt |
| D873,196 S | 1/2020 | Harrington |
| 10,529,159 B2 | 1/2020 | Sivill |
| D875,640 S | 2/2020 | Sveum |
| 10,668,913 B2 | 6/2020 | Metz |
| 10,696,500 B2 | 6/2020 | Yule |
| D892,706 S | 8/2020 | Sveum |
| D892,707 S | 8/2020 | Sveum |
| D892,797 S | 8/2020 | Hu |
| 10,793,119 B2 | 10/2020 | Jette |
| 10,807,572 B1 | 10/2020 | Griswold |
| 10,836,362 B2 | 11/2020 | Waddell |
| 10,864,895 B2 | 12/2020 | Palmer |
| 10,906,512 B2 | 2/2021 | Gregory |
| 11,007,920 B2 | 5/2021 | Vande Sande |
| 11,046,298 B1* | 6/2021 | Desmarais ............ G01G 19/021 |
| 11,097,697 B2 | 8/2021 | Hu |
| 11,097,698 B2 | 8/2021 | Stieger |
| 11,285,932 B2* | 3/2022 | Bowman ................ B60T 17/22 |
| 11,479,217 B2 | 10/2022 | Palmer |
| 11,486,104 B2 | 11/2022 | Martinez |
| 11,535,209 B2 | 12/2022 | Palmer |
| 11,702,304 B2 | 7/2023 | Biasutto et al. |
| 2001/0026751 A1 | 10/2001 | Berends |
| 2002/0096402 A1 | 7/2002 | Tallman |
| 2002/0141852 A1 | 10/2002 | Hahn |
| 2003/0047391 A1 | 3/2003 | Ericson |
| 2003/0099528 A1 | 5/2003 | Hageman |
| 2004/0071533 A1 | 4/2004 | Kondo |
| 2004/0183056 A1 | 9/2004 | Funk |
| 2005/0133315 A1 | 6/2005 | Hoofard |
| 2005/0189463 A1* | 9/2005 | Fenyves .................... B60T 3/00 248/346.5 |
| 2005/0226705 A1* | 10/2005 | Wilson ................ B65G 69/005 414/401 |
| 2006/0051196 A1 | 3/2006 | McDonald |
| 2006/0159543 A1 | 7/2006 | Winsor |
| 2007/0050999 A1 | 3/2007 | Milner |
| 2008/0124203 A1 | 5/2008 | McDonald |
| 2008/0277211 A1 | 11/2008 | Wolfram |
| 2008/0304930 A1 | 12/2008 | Zhan |
| 2008/0314693 A1 | 12/2008 | Van Aspert |
| 2009/0026022 A1* | 1/2009 | Andersen .................. B60T 3/00 188/32 |
| 2010/0108448 A1 | 5/2010 | Wyers |
| 2010/0260586 A1* | 10/2010 | Manone ............... B65G 69/005 414/401 |
| 2011/0100765 A1 | 5/2011 | Bird |
| 2011/0226565 A1* | 9/2011 | Jette .......................... B60T 3/00 188/32 |
| 2011/0240416 A1* | 10/2011 | Brooks ...................... B60T 3/00 188/32 |
| 2011/0290596 A1 | 12/2011 | Perkins |
| 2012/0006632 A1* | 1/2012 | Nelson ................ B65G 69/005 188/32 |
| 2013/0037356 A1 | 2/2013 | Andersen |
| 2013/0048439 A1 | 2/2013 | Marcum |
| 2013/0156524 A1 | 6/2013 | Bullock |
| 2013/0280003 A1 | 10/2013 | Wessel |
| 2015/0027818 A1 | 1/2015 | Bellota |
| 2016/0090072 A1* | 3/2016 | Metz .................... B65G 69/005 188/1.11 E |
| 2017/0043751 A1 | 2/2017 | Saltzman |
| 2017/0144645 A1 | 5/2017 | Metz |
| 2017/0259792 A1 | 9/2017 | Austin |
| 2017/0369042 A1 | 12/2017 | Rancourt |
| 2017/0369260 A1 | 12/2017 | Hoofard |
| 2018/0003590 A1 | 1/2018 | Etches |
| 2018/0178764 A1 | 6/2018 | Hu |
| 2018/0345946 A1* | 12/2018 | Bowman .............. B65G 69/005 |
| 2018/0347254 A1 | 12/2018 | McNeill |
| 2019/0152449 A1 | 5/2019 | Metz |
| 2019/0202418 A1 | 7/2019 | Waddell |
| 2019/0299943 A1 | 10/2019 | Gregory |
| 2019/0329742 A1 | 10/2019 | Stieger |
| 2019/0329994 A1 | 10/2019 | Ion |
| 2020/0122693 A1 | 4/2020 | Dolan |
| 2020/0216276 A1* | 7/2020 | Palmer ..................... B60T 3/00 |
| 2020/0219342 A1 | 7/2020 | Sivill |
| 2020/0290587 A1 | 9/2020 | Duffy |
| 2021/0031736 A1 | 2/2021 | Perozzo |
| 2021/0094518 A1 | 4/2021 | Palmer |
| 2021/0146891 A1 | 5/2021 | Anderl |
| 2021/0146892 A1 | 5/2021 | Anderl |
| 2021/0170997 A1* | 6/2021 | Widgery .................. B60T 3/00 |
| 2021/0179997 A1 | 6/2021 | Li |
| 2021/0237695 A1 | 8/2021 | Barattini |
| 2021/0261101 A1* | 8/2021 | Chartier .............. F16M 13/022 |
| 2021/0323513 A1 | 10/2021 | Redaelli |
| 2022/0234551 A1 | 7/2022 | Laudick |
| 2023/0038387 A1 | 2/2023 | Palmer |
| 2023/0126227 A1 | 4/2023 | Palmer |
| 2023/0256945 A1* | 8/2023 | Chartier ................... F16D 3/16 410/30 |

OTHER PUBLICATIONS

Blue Giant Interlock Chock; An Integrated Safety Communication Solution; 2 pages; WC-ITC-08182020; copyright 2020.

Rite-Hite Genisys GWC-1000 Global Wheel Chock, Installation/Service/Owner's Manual, Publication: AMEN00274 Jun. 26, 2020; 24 pages.

Rite-Hite Global Wheel Chock, Global Wheel Chock Restraints, GWC-1000 Features and Benefits, Mar. 11, 2021; 4 pages.

SAE International; Surface Vehicle Standard; Wheel Chocks; pp. 1-6; Oct. 2020.

* cited by examiner

SYSTEM AND METHOD FOR RESTRAINING A VEHICLE PROXIMATE A LOADING DOCK

CROSS-REFERENCE TO RELATED APPLICATION

This application claims the benefit of U.S. Provisional Application No. 63/081,275, filed Sep. 21, 2020, entitled SYSTEM AND METHOD FOR RESTRAINING A VEHICLE PROXIMATE A LOADING DOCK, which is hereby incorporated by reference in its entirety herein.

FIELD

The present disclosure relates to vehicle restraint systems used to restrain vehicles, such as tractor-trailers, proximate a loading dock. More specifically, the present disclosure relates to wheel chocks for restricting movement of a vehicle wheel when the vehicle is at a loading dock.

BACKGROUND

Vehicle restraint systems are commonly used at facilities to restrain a vehicle, such as a tractor-trailer relative to loading docks of the facilities. When applied, such restraint systems inhibit movement of the vehicle away from the loading dock and/or a dock plate. A dock plate is a ramp or the like that provides a transition from a dock area to a load space associated with an interior of the vehicle. The vehicle restraint system restrains the vehicle such that the bed of the vehicle's storage area can be conveniently accessed by personnel and/or equipment associated with loading and unloading operations while the position of the vehicle is maintained relative to the dock or dock area. This allows the contents of the vehicle to be exchanged between the facility.

In many dock restraint systems, the vehicle restraint system includes a wheel chock that is placed adjacent to a wheel of the vehicle on an opposite side of the wheel from the loading dock. The wheel chock is typically put in place prior to opening of a loading dock door. When applied, the wheel chock acts as a barrier that inhibits rolling of the wheel (and thereby, the vehicle) away from the loading dock. The wheel chock is typically removed after the loading dock door has been closed.

In some instances, a wheel chock operator may not install the wheel chock, or may improperly install the wheel chock, prior to the loading dock door opening. In such instances, a vehicle may be able to move away from the loading dock before unloading or loading of the vehicle is complete. Further, because wheel chocks are installed at an exterior of the loading dock of a facility, in some instances, a worker inside the facility may not be aware whether the wheel chock has been installed (or properly installed), or whether the wheel chock has been removed.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be employed for particular applications or implementations.

DETAILED DESCRIPTION

Figure 1:
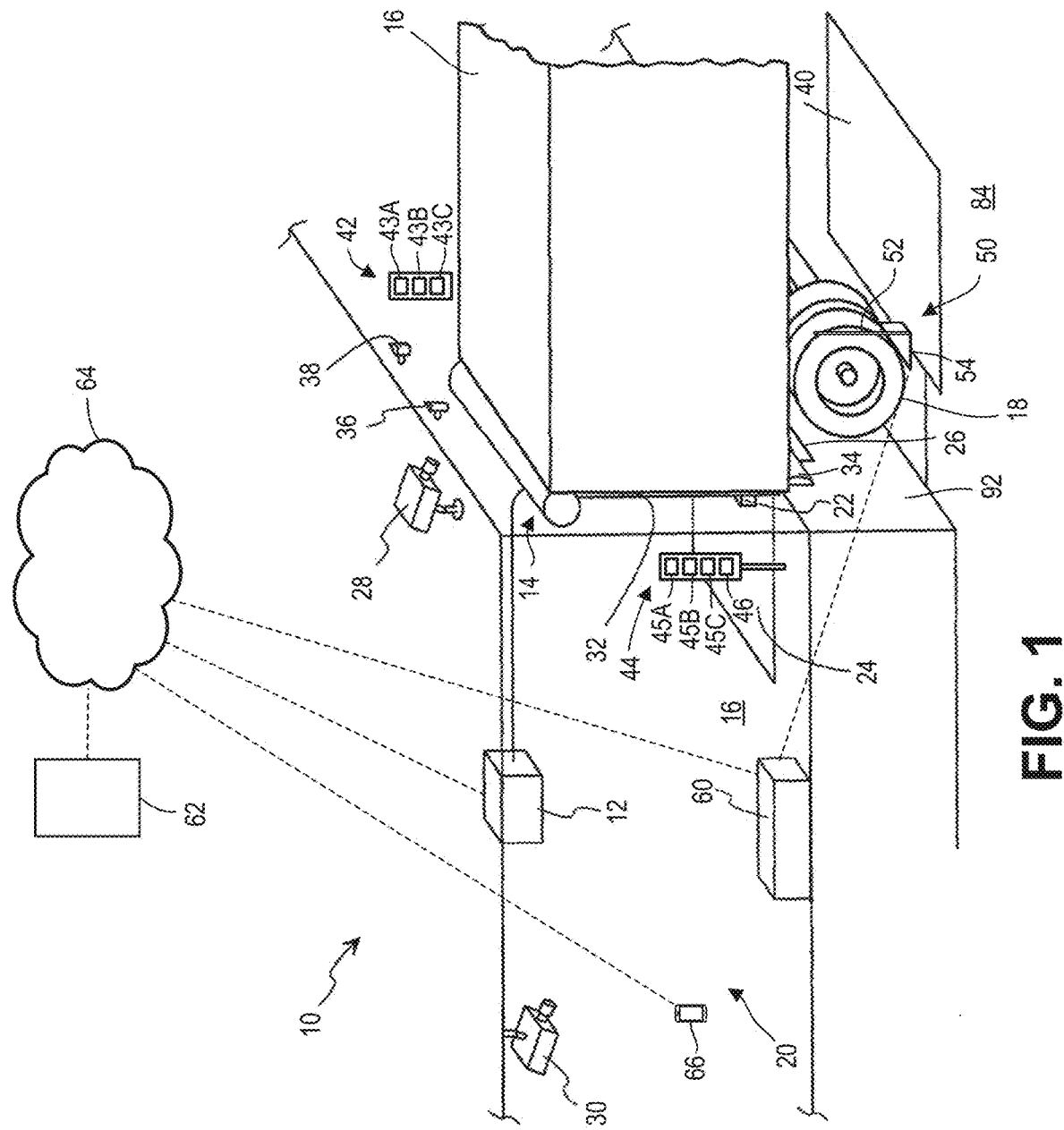
FIG. 1 is a schematic diagram showing an example loading dock.

Referring now to FIG. 1, a loading dock system 10 of a facility includes a dock door operator 12 that is configured to be operatively connected to a loading dock door 14 to move the loading dock door 14 between a closed position and an open position. The loading dock door 14 shown in FIG. 1 is in the form of a roller door. In other aspects, the loading dock door 14 may be in the form of a paneled door, a swinging door, a gate, or other suitable barrier for controlling access to an interior of the facility.

The loading dock system 10 may include one or more loading dock components, indicated generally at 20. Example loading dock components 20 include a photo beam system 22, a safety edging of the door 14, a dock leveler 24, a vehicle restraint 26 (e.g., a trailer hook or lock), an exterior camera 28, an interior camera 30, edge guards or dock seal 32, dock bumper 34, an optical detector 36 (e.g., a camera or light time-of-flight sensor), a sensor 38 (e.g., a passive infrared (PIR), ultrasonic, and/or microwave sensor), and a loop detector 40.

The loading dock components 20 may also include one or more visual indicators such as an exterior light box 42 and/or an interior light box 44. The exterior light box 42 may include one or more lights (e.g., green light 43A, red light 43B, and an auxiliary light 43C). The auxiliary light 43C may be an amber light or other color light, and may be indicative of the status of one or more loading dock components 20 such as a wheel chock, discussed in greater detail below. The auxiliary light 43C may also be used in combination with one or both of the green light 43A and the red light 43B. For example, auxiliary light 43C may be used in combination with the green light 43A to indicate that a vehicle restraint such as a trailer hook or wheel chock is being bypassed to able to continue to operate the dock leveler 24. The auxiliary light 43C may also, or may instead, be used in combination with the green light 43A to indicate a trailer hook or wheel chock is engaged, but the dock leveler 24 is still in the stored position. The auxiliary light 43C may also, or may instead, be used in combination with the red light 43B to indicate a fault condition to alert a worker inside or outside the loading dock facility.

Similarly, the light box 44 may include one or more lights (e.g., green light 45A, red light 45B, and an auxiliary light 45C that may be similar to auxiliary light 43C). The interior light box 44 may further include, or may be communicatively coupled to, a user interface such as a control panel 46. The control panel 46 may be communicatively connected (e.g., via wired or wireless connection) to the dock door operator 12, a gateway 60, other loading dock components 20, a remote server computer 62, and other components of the loading dock system 10. The control panel 46 may also include a display, lights, a speaker, buttons, a microphone, etc. for receiving a user input or communicating an output to a user.

The loading dock components 20 may also include a vehicle restraint such as a wheel chock 50. The wheel chock 50 may include a handle portion 52 and a base portion 54. As discussed in greater detail below, the wheel chock 50 is adapted to detect the presence of a wheel 18 of a vehicle 16 when the wheel chock 50 is within a predetermined proximity of the wheel 18. The vehicle 16 may be a tractor-trailer, flatbed truck, or cargo van as some examples.

One or more of the loading dock components 20 may be in communication (e.g., wired or wireless communication) with one or both of the dock door operator 12 and the gateway 60. The gateway 60 may include a communications hub that is in communication with the various loading dock components 20, the dock door operator 12, and, over one or more networks 64, with a remote server computer 62.

Figure 13:
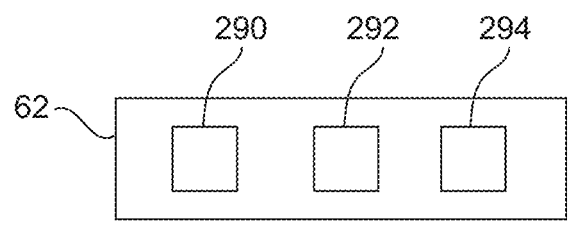
FIG. 13 is an example block diagram of the remote server computer of FIG. 1.

The remote server computer 62, discussed in greater detail with respect to FIG. 13, is configured to communicate with the dock door operator 12 over one or more networks 64, which may include the Internet. The remote server computer 62 may facilitate operation of the dock door operator 12. For example, the remote server computer 62 may communicate control commands (e.g., open, close, start, stop, etc.) to the dock door operator 12. In another example, the remote server computer 62 may send a control command to the dock door operator 12 and/or the gateway 60 to configure at least one component of the loading dock components 20 to facilitate receiving the vehicle 16 at the loading dock system 10. Such a configuration command may be issued, for example, upon the remote server computer 62 causing the dock door operator 12 to move the loading dock door 14. In still another example, the control panel 46 may communicate information, such as data pertaining to operations of the loading dock system, to the remote server computer 62. The remote server computer 62 may store the information, and may provide information to user devices 66. The remote server computer 62 may take a variety of embodiments. For example, the remote server computer 62 may be an "off-site" server computer that is not located at the loading dock facility. In another embodiment, the remote server computer 62 is an "on-site" server computer that is located at the loading dock facility. For example, the remote server computer 62 may be located in an office of the loading dock facility.

One or more components of the loading dock system 10 may also be configured to communicate with a user device 66. The user device 66 generally comprises an electronic device configured to allow a user (e.g., via a client application executing on the electronic device) to monitor the operation of, and communicate with, components of the loading dock system 10. The user device 66 is a computing device and may include or be a smartphone, a laptop computer, a tablet computer, a personal computer (PC), an internet of things (IoT) device, as some examples. Other examples of the user device 66 include in-vehicle computing devices such as an infotainment system. The user device 66 may include, for example, a processor, a memory, communication circuitry, and a user interface.

Figure 2:
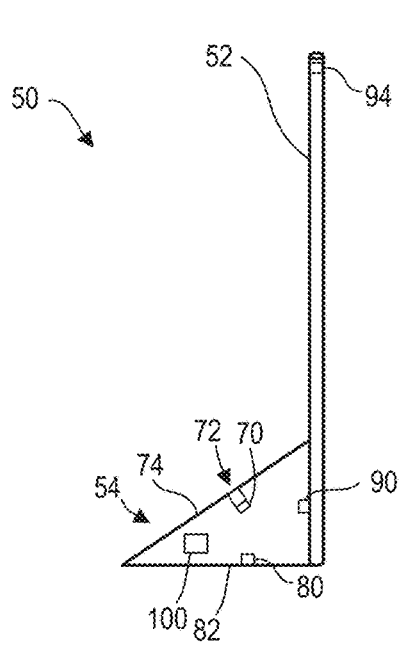
FIG. 2 is a schematic diagram showing a first example wheel chock.

Referring to FIG. 2, the wheel chock 50 may include one or more sensors. For example, the wheel chock 50 may include a wheel sensor 70 configured to detect the presence and/or proximity of an object such as a wheel 18, which includes a tire and a rim. The wheel sensor 70 may be disposed within an opening 72 that extends from a contact portion 74 of the wheel chock 50 such that the wheel sensor 70 can detect the presence and/or proximity of the object through the opening 72. In one example, the wheel sensor 70 includes an ultrasonic sensor configured to generate high frequency sound waves and evaluate sound waves that are reflected back by an object. By measuring the time interval between sending the signal and receiving the sound waves, the wheel sensor 70 can determine if a wheel 18 is present at the opening 72. In another example, the sensor 70 may include a proximity-sensing photoelectric sensor in which an emitter is adapted to emit a beam of light (such as pulsed infrared, visible red, or laser) that diffuses through the opening 72. As the wheel 18 covers the opening 72, part of the light beam reflects back to a receiver, detection occurs, and an output may be transmitted to a controller or microprocessor. The wheel sensor 70 may also, or may instead, include a camera, a pressure sensor, and/or an infrared sensor for detecting the presence of a wheel 18 at the contact portion 74 of the wheel chock 50.

In one approach, the wheel sensor 70 is an always-on sensor. In another approach, the wheel sensor 70 can be activated and deactivated. For example, as discussed in greater detail with respect to FIGS. 3-5, the handle portion 52 may be configured to activate and/or deactivate the wheel sensor 70 upon pivoting of the handle portion 52 relative to the base portion 54.

The wheel chock 50 may also include a ground sensor 80. The ground sensor 80 may be any suitable sensor for determining a lower portion 82 of the wheel chock 50 is disposed on a ground surface (e.g., ground surface 84 of FIG. 1) of the loading dock area. The ground sensor 80 may include a switch, such as an electrical or mechanical switch (e.g., a limit switch), or any other suitable sensor for sensing the wheel chock 50 is resting on the ground surface 84. Additionally or alternatively, the ground sensor 80 may include a magnetic sensor that is configured to detect a ground surface.

The wheel chock 50 may be configured to deactivate the wheel sensor 70 when the ground sensor 80 does not detect a ground surface 84, and may activate the wheel sensor 70 in response to the ground sensor 80 sensing the ground surface 84. In one approach, the wheel chock 50 may determine a vehicle 16 is properly chocked when both the wheel sensor 70 detects the wheel 18 and the ground sensor 80 detects a surface indicative of the ground.

The wheel chock 50 may also include a storage sensor 90 that is configured to detect whether the wheel chock 50 is disposed in a stored position (e.g., against an exterior wall 92 of the loading dock, shown in FIG. 1). When in the stored position, as detected by the storage sensor 90, the wheel chock 50 may disable the wheel sensor 70 or disregard proximity and/or presence detections by the wheel sensor 70.

The wheel chock 50 may also include a handle sensor 94 disposed along the handle portion 52 of the wheel chock 50. The handle sensor 94 may be configured to detect the presence and/or proximity of the wheel 18 relative to the handle sensor 94. For example, the handle sensor 94 may include an ultrasonic sensor, a Hall effect sensor, a camera, and/or a photobeam sensor.

The wheel chock 50 further includes communication circuitry 100 for communicating with other components such as the dock door operator 12, the control panel 46, the gateway 60, other loading dock components 20, the remote server computer 62, or other components of the loading dock system 10. For example, when the vehicle 16 is parked and the wheel sensor 70 detects the presence of a wheel 18 indicative of the vehicle 16 being properly chocked, the wheel chock 50 may relay the condition to the control panel 46, which may send a command to illuminate a light at one or both of the exterior light box 42 and the interior light box 44.

Figure 3:
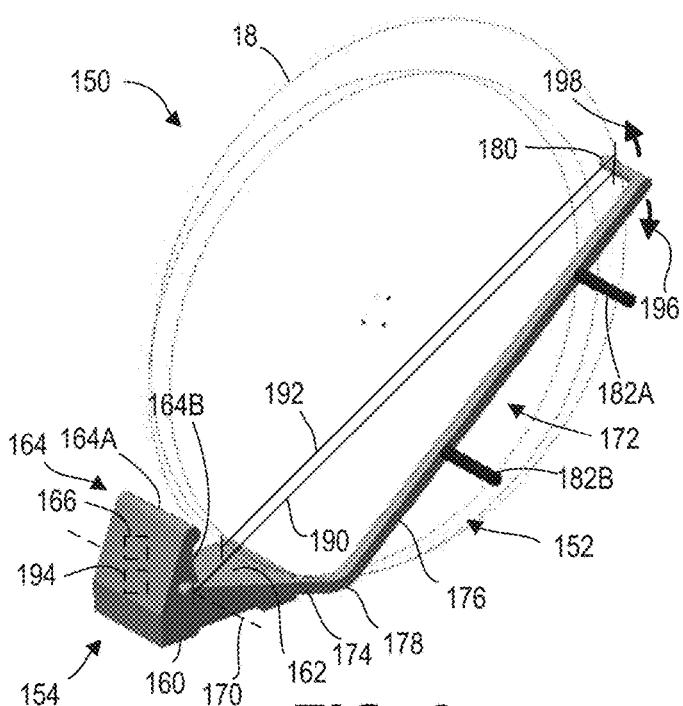
FIG. 3 is a first perspective view of a second example wheel chock.
Figure 4:
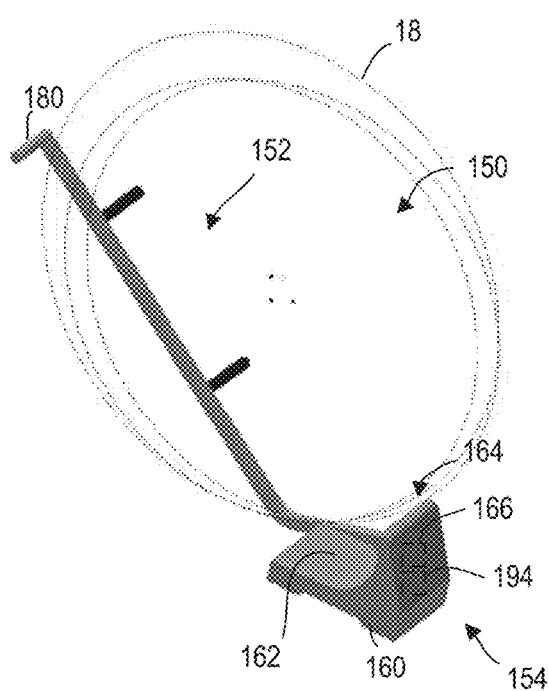
FIG. 4 is a second perspective view of the wheel chock of FIG. 3.

Referring to FIGS. 3 and 4, an example wheel chock 150 is shown. The wheel chock 150 includes a handle portion 152 and a base portion 154. The base portion 154 includes a ground-contacting portion 160, a wheel-engaging portion 162, and a wheel stop portion 164. One or both of the ground-contacting portion 160 and the wheel-engaging portion 162 may include a material such as rubber that creates a high coefficient of friction with the ground surface 84 and the tire of the wheel 18, respectively. The wheel stop portion 164 includes a concave surface that extends to a raised lip 164A. If a vehicle 16 moves away from the loading dock area when the wheel chock 150 is engaged with a tire 18 of the vehicle 16, the tire 18 moves along the wheel-engaging portion 162 until the tire 18 engages the raised lip 164A. In this way, the wheel stop portions inhibits further rotation of the wheel 18 and corresponding forward movement of the vehicle away from the loading dock area. The base portion 154 also includes at least one sensor, indicated at 166. The at least one sensor 166 may include a wheel sensor, a ground sensor, and/or a storage sensor, which may be the same as or similar to the wheel sensor 70, ground sensor 80, and storage sensor 90, respectively, discussed with respect to FIG. 2.

The handle portion 152 is pivotable relative to the base portion 154 about a pivot axis 170. The handle portion 152 includes an arm 172 having a first portion 174 pivotably attached to the base portion 154, and a second portion 176 that extends at an angle relative to the first portion 174 to form an elbow portion 178 therebetween. The handle portion 152 may include a distal handle 180 and one or more intermediate handles 182A, 182B between the distal handle 180 and the pivot axis 170. The intermediate handles 182A and 182B may be used to assist in placing the base portion 154 of the wheel chock 150 into engagement with a wheel 18, and may be used to provide leverage when pulling the wheel chock 150 out of engagement with the wheel 18. When the wheel chock 150 is engaged with a wheel 18 of a vehicle 16, the distal handle 180 may extend in a lateral direction toward the vehicle 16, and the intermediate handles 182A, 182B may extend in a lateral direction away from the vehicle 16.

The distal handle 180 is spaced from the pivot axis 170 a distance, indicated at 190, that is greater than a diameter, indicated at 192, of a wheel 18 of a vehicle 16. In this way, when the wheel chock 150 is engaged with the wheel 18, the handle portion 152 may be pivoted about the pivot axis 170 such that the distal handle 180 is pivoted in a clockwise direction 196 about an outer tread surface of the wheel 18. The handle portion 152 may be pivoted until the elbow portion 178 contacts a ground surface (e.g., ground surface 84 of FIG. 1), so that the wheel 18 is disposed between the base portion 154 and the distal handle 180 of the handle portion 152. In this way, opposing end portions of the wheel chock 150 (e.g., the wheel stop portion 164 of the base portion 154 and the distal handle 180 of the handle portion 152) extend across opposing tread surfaces of the wheel 18 and contain the wheel 18 therebetween.

The wheel chock 150 may further include a switch 194, such as a limit switch. The switch 194 may be activated and deactivated as a function of the position of the handle portion 152. For example, when the handle portion 152 is moved (e.g., pivoted in the direction indicated at 196) to an engaged or closed first position shown in FIGS. 3 and 4, the handle portion 152 may activate the switch 194. The first position may be a predetermined angular orientation or range of predetermined angular orientations of the handle portion 152. In some instances, the elbow portion 178 contacts the ground when the handle portion is in the first position. When the handle portion 152 is moved in an opposite direction (e.g., pivoted in the direction indicated at 198) to a second position, the handle portion 152 may deactivate the switch 194. The second position may be a predetermined angular orientation or range of predetermined angular orientations of the handle portion 152. The handle portion 152 may have a limited degree of angular movement about a pivot axis.

In one approach, the sensor 166 of the wheel chock 150 (which may be similar to wheel sensor 70 discussed above) may be activated and deactivated as determined by the switch 194. Thus, when the handle portion 152 is rotated to the position shown in FIGS. 3 and 4, the sensor 166 may be activated to detect the presence of a wheel 18 at the wheel-engaging portion 162 of the base portion 154. When the handle portion 152 is pivoted in direction 198, the sensor 166 may be deactivated.

Figure 5:
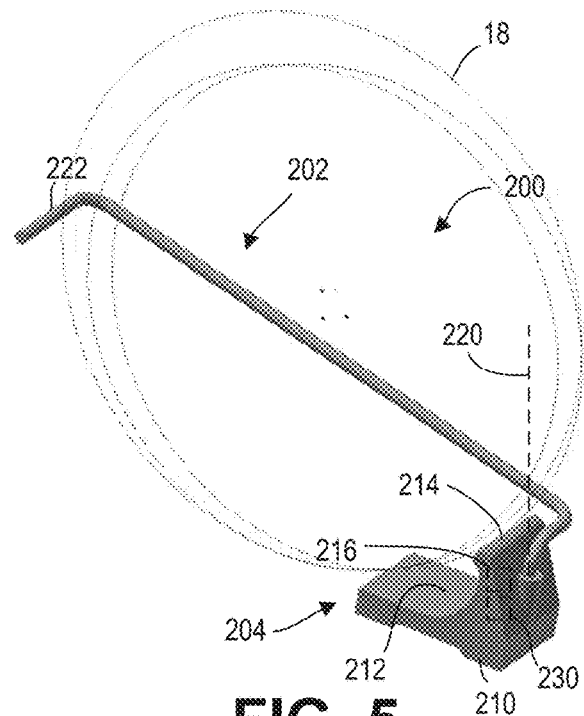
FIG. 5 is a perspective view of a third example wheel chock.

Referring to FIG. 5, another example wheel chock 200 is shown. Similar to wheel chock 150, the wheel chock 200 may include a handle portion 202 and a base portion 204. The base portion 204 includes a ground-contacting portion 210, a wheel-engaging portion 212, and a wheel stop portion 214. The base portion 204 also includes at least one sensor, indicated at 216. The at least one sensor 216 may include a wheel sensor, a ground sensor, and/or a storage sensor, which may be the same as or similar to the wheel sensor 70, ground sensor 80, and storage sensor 90, respectively, discussed with respect to FIG. 2.

The handle portion 202 is movable relative to the base portion 204, such as being pivotable relative to the base portion 204 about a pivot axis 220. The handle portion 202 may include a distal handle 222. When the wheel chock 200 is engaged with a wheel 18 of a vehicle 16, the distal handle 222 may extend in a direction toward the vehicle 16. Similar to the distal handle 180 of FIGS. 3 and 4, the distal handle 222 is spaced from the pivot axis 220 a distance that is greater than a diameter of a wheel 18 of a vehicle 16. In this way, when the wheel chock 200 is engaged with the wheel 18, the handle portion 202 may be pivoted about the pivot axis 220 such that the distal handle 222 is pivoted toward the wheel 18. The handle portion 202 may be pivoted until the distal handle 222 extends inwardly along a tread surface of the wheel 18.

The wheel chock 200 may further include a switch 230, such as a limit switch. The switch 230 may be activated and deactivated as a function of the position of the handle portion 202. For example, when the handle portion 202 is pivoted toward the wheel 18 to the position shown in FIG. 5, the handle portion 202 may activate the switch 230. When the handle portion 202 is pivoted in an opposite direction (e.g., generally away from the wheel 18), the handle portion 202 may deactivate the switch 194.

In one approach, the sensor 216 of the wheel chock 200 is similar to wheel sensor 70 and may be activated and deactivated by the switch 230. Thus, when the handle portion 202 is rotated to the position shown in FIG. 5 such that the distal handle 222 extends inwardly along an outer tread surface of the wheel 18, the sensor 216 may be activated to detect the presence of a wheel 18 at the wheel-engaging portion 212 of the base portion 204. When the handle portion 202 is rotated in an opposite direction away from the wheel 18, the sensor 216 may be deactivated.

Figure 6:
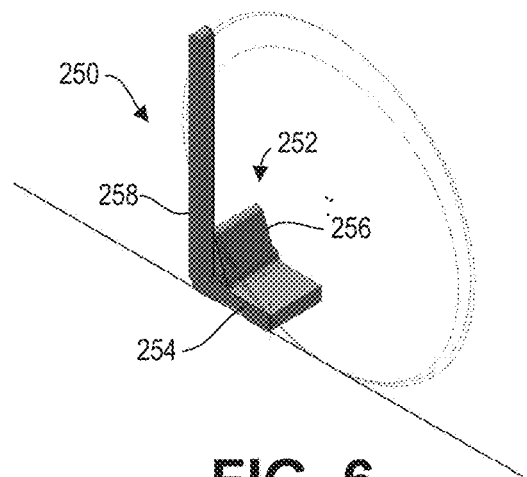
FIG. 6 is a side elevation view of a fourth example wheel chock with a handle portion in a first position.
Figure 7:
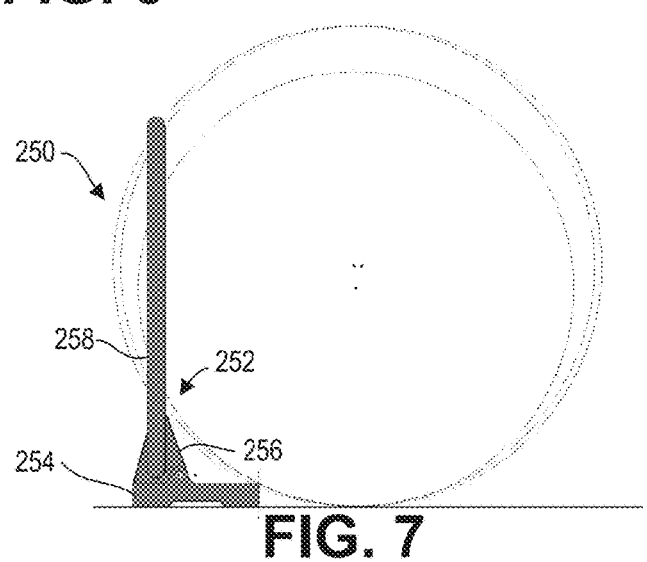
FIG. 7 is a side elevation view of the wheel chock of FIG. 6 with the handle portion in the first position.
Figure 8:
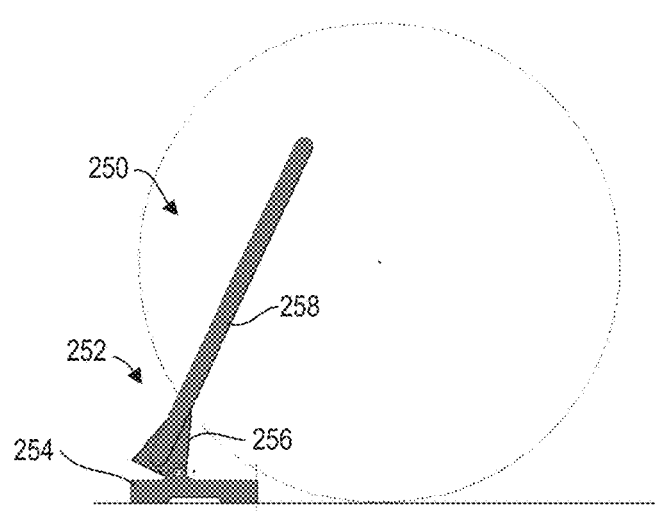
FIG. 8 is a side elevation view of the wheel chock of FIG. 6 with the handle portion in a second position.

Referring to FIGS. 6-8, another example wheel chock 250 is shown. The wheel chock 250 may include a handle portion 252 and a base portion 254. The handle portion 252 may include wheel stop portion 256 and an elongated portion 258 that extends from the wheel stop portion 256. The wheel stop portion 256 may be pivotably connected to the base portion 254. Pivoting of the handle portion 252 from the position shown in FIGS. 6 and 7 to the position shown in FIG. 8 (e.g., toward a center of the tire 18) may drive the wheel stop portion 256 into the tire 18, which thereby urges the base portion 254 out from underneath the tire 18 to facilitate removal of the wheel chock 250.

Figure 9:
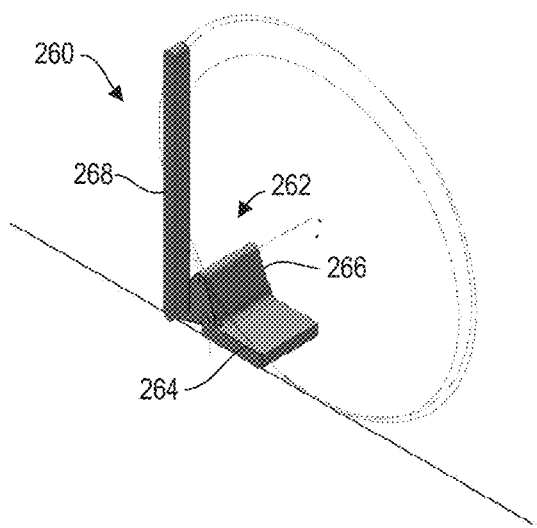
FIG. 9 is a perspective view of a fifth example wheel chock with a handle portion in a first position.
Figure 10:
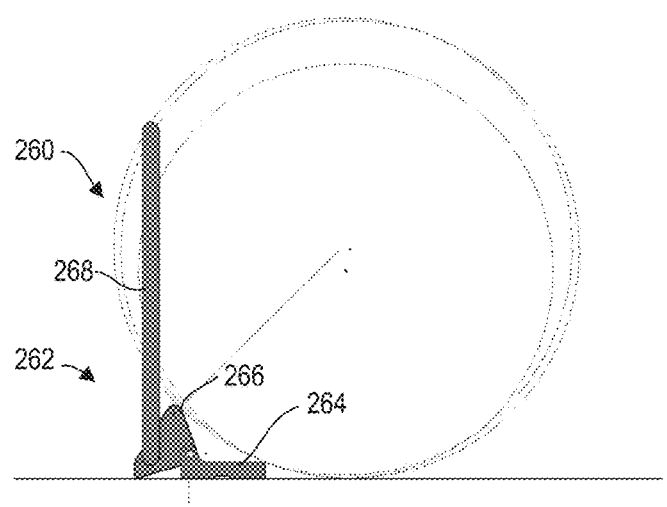
FIG. 10 is a side elevation view of the wheel chock of FIG. 8 with the handle portion in the first position.
Figure 11:
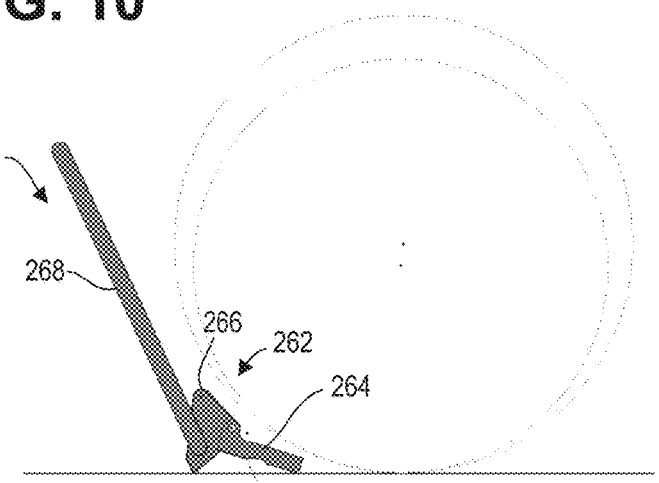
FIG. 11 is a side elevation view of the wheel chock of FIG. 8 with the handle portion in a second position.

Referring to FIGS. 9-11, another example wheel chock 260 is shown. The wheel chock 260 may include a handle portion 262 and a base portion 264. The handle portion 262 may include wheel stop portion 266 and an elongated portion 268 that extends from the wheel stop portion 266. The wheel stop portion 266 may be pivotably connected to the base portion 264. Pivoting of the handle portion 262 from the position shown in FIGS. 9 and 10 to the position shown in FIG. 11 (e.g., away from a center of the tire 18) may cause the wheel stop portion 266 to pull and lift the base portion 264 out from underneath the tire 18 to facilitate removal of the wheel chock 260.

Figure 12:
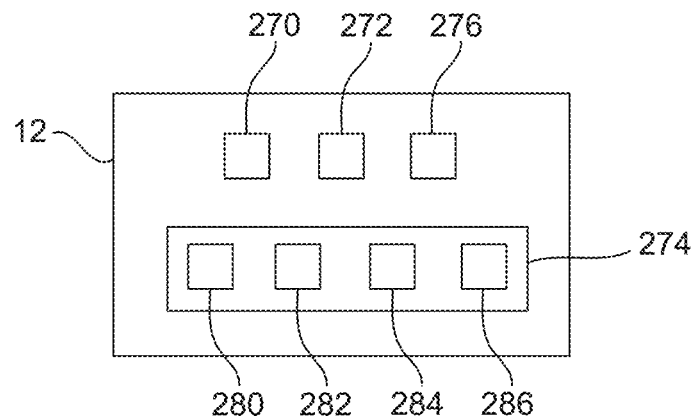
FIG. 12 is an example block diagram of the movable barrier operator of FIG. 1.

Referring to FIG. 12, the dock door operator 12 may include a motor 270, a memory 272, and communication circuitry 274. The dock door operator 12 may further include processing circuitry 276 that is operatively coupled to one or more of the motor 270, the memory 272, and the communication circuitry 274. The motor 270 is configured to be connected to a movable barrier (e.g., loading dock door 14 of FIG. 1) to move the movable barrier between open and closed positions. The memory 272 may store identification and security (e.g., rolling code) information for authorized remote controls.

The communication circuitry 274 may be configured to receive wired and/or wireless communications from a local device (such as a local transmitter or local sensor) and/or a remote device (such as the remote server computer 62 of FIG. 1). In this way, the communication circuitry 274 may include a radio frequency signal receiver or transceiver 280 that may receive a command signal from a radio frequency signal transmitter to change the state of the loading dock door 14.

The communication circuitry 274 may further include a network interface 282. The network interface 282 may be configured to communicate with the remote server computer 62 over the network 64, as shown in FIG. 1. The network interface 282 may communicate with the network 64 via wired and/or wireless approaches, such as a wireless gateway or access point, e.g., a Wi-Fi router. The network interface 282 may receive a state change command from the remote server computer 62 (e.g., via the network 64) to cause the dock door operator 12 to change the state (e.g., a closed position to an open position or vice versa) of the loading dock door 14. The network interface 282 may also communicate information to the remote server computer 62. Such information may include information identifying the vehicle 16, a user (e.g., driver and/or passenger) associated with the vehicle 16, the freight of the vehicle 16, information pertaining to the loading dock door 14, information pertaining to one or more dock components 20 associated with the loading dock door 14, or any combination thereof.

The communication circuitry 274 may also include a wireless transceiver 284. The wireless transceiver may include a long-range wireless transceiver and/or a short-range wireless transceiver that may communicate with other devices. For example, the communication circuitry may receive communications from one or more devices such as sensors having WiMax or LoRa-based communication operability, such as a V2X (vehicle to anything) sensor. The communication circuitry 274 may also include a wired communication interface 286 for communicating with one or more loading dock components 20.

Referring to FIG. 13, the remote server computer 62 includes a communication interface 290 configured to communicate via the network 64 with the dock door operator 12 or other components of the loading dock system 10. The communication interface 290 is further configured to communicate with the user device 66 via the network 64.

The remote server computer 62 also includes a non-transitory, computer-readable medium such as a memory 292 for storing information. For example, the memory 292 may store an operational history of a wheel chock (e.g., wheel chocks 50, 150, 200). The memory 292 may also store facility information such as facility identification, facility location, facility contact information, facility history information, etc. Schedule information, such as authorized arrival times and departure times for vehicles 16, may also be stored in the memory 292. The memory 292 may also store transport logs, which may include actual arrival times and/or actual departure times. The memory 292 may also store barrier operator information, which may include the times of operation of a given barrier operator, a number of actuation events for a given barrier operator (e.g., lifetime actuation events, or actuation events since a last maintenance operation). The memory 292 may store information from the loading dock components 20 such as presence detections, times of presence detections, and/or estimated accuracy of detections. The memory 292 may also store user information, which may include user identification information, account information, contact information, user histories, still or moving images of the user, vehicle, etc., and/or user notes. The memory 292 may further store freight information such as freight identifiers, freight tracking information, freight notes, bills of lading, and/or packaging slips. The memory 292 may also store loading dock information, such as the status of a dock door operator 12, height of a dock leveler 24, and/or identifications of sensors and/or configurable devices at a given loading dock.

The remote server computer 62 also includes a processor 294 that is operatively coupled to the communication interface 290 and the memory 292. The processor 294 may communicate a configuration command to effect a configuration of one or more loading dock components.

Figure 14:
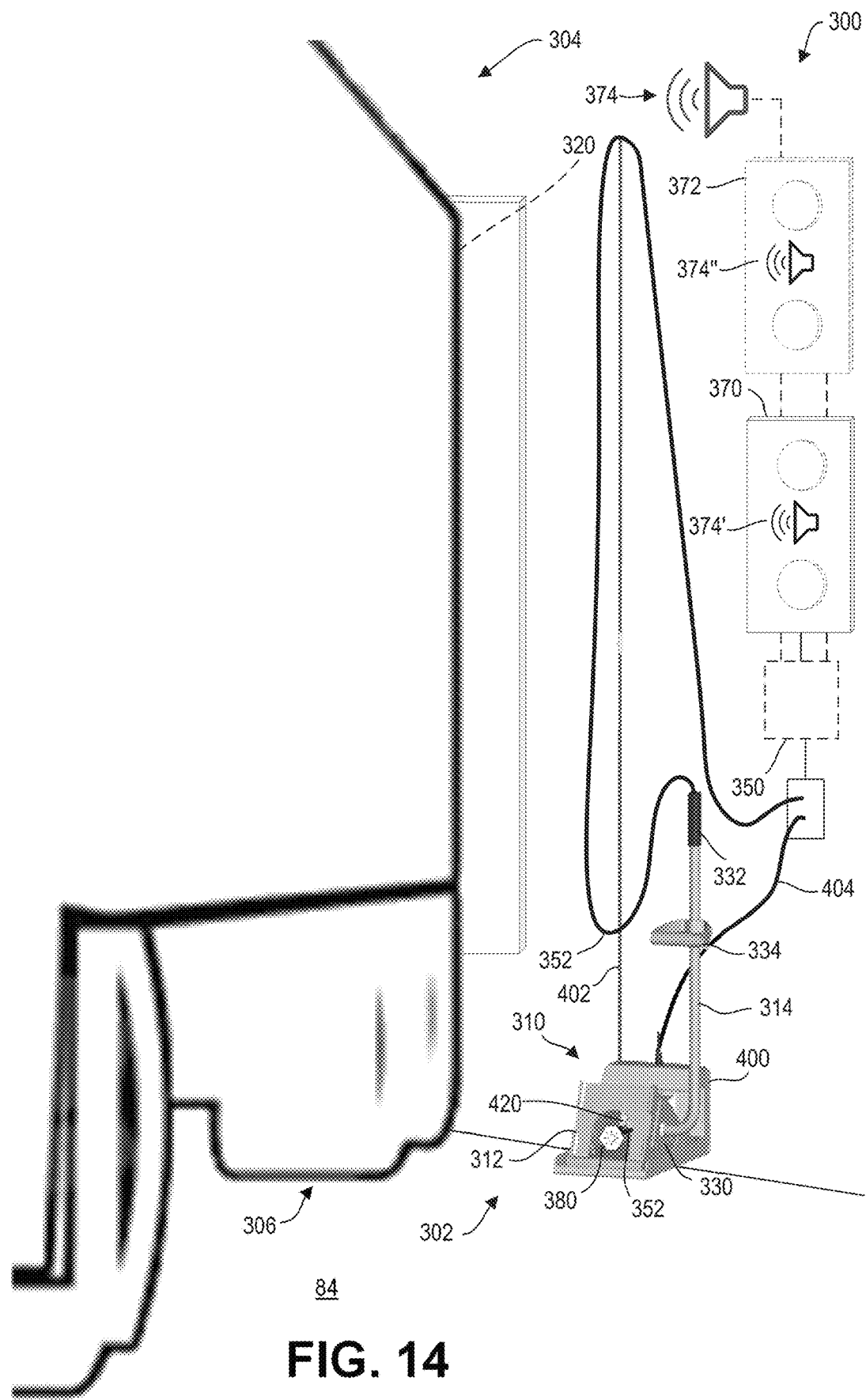
FIG. 14 is a perspective view of an example loading dock showing a wheel chock assembly including a sixth example wheel chock and a wheel chock station.

Referring now to FIG. 14, a loading dock system 300 is shown. The loading dock system 300 may be similar in many regards to the loading dock system 10 of FIG. 1 and may include some or all of the loading dock components 20 discussed with respect to FIG. 1. As previously discussed, one or more of the loading dock components 20 may be in communication with a gateway 60 that is in communication with a remote server computer 62.

The loading dock system 300 includes a wheel chock system 302 that facilitates and monitors the restraint of a vehicle 304. The vehicle 304 may be a tractor-trailer, a trailer decoupled from a tractor, flatbed truck, or cargo van as some examples. The wheel chock system 302 includes a vehicle restraint such as a wheel chock 310. The wheel chock 310 can be moved into a chock position wherein the wheel chock 310 is engaged with a wheel 306 of the vehicle 304 to restrict movement of the vehicle 304 away from a loading dock door 320. As discussed in greater detail below, the wheel chock 310 is configured to detect the presence of a wheel 306 of a vehicle 304 when the wheel 306 is within a predetermined proximity of the wheel chock 310.

The wheel chock 310 may include a body portion 312 and a handle portion 314. The handle portion 314 may be secured to the body portion 312 via a handle plate 330. The handle plate 330 may be secured to the body portion 312 with one or more welds or fasteners. In one approach, the handle portion 314 is fixed to the handle plate 330. In another approach, the handle portion 314 is rotatable relative to the handle plate 330. The handle plate 330 and handle portion 314 may be fixed at either peripheral side of the body portion 312.

The handle portion 314 may include an upright gripping portion 332, and may also or instead include a transverse gripping portion such as a transverse handle 334. At least a portion of the handle portion 314 may include a hollow interior. As discussed in greater detail below, one or more components of the wheel chock 310 are operatively and/or communicatively coupled to a controller 350 of the wheel chock system 302 via cable 352. The cable 352 may extend through the hollow portion of the handle portion 314 and to the wheel chock body 312 to connect with components of the wheel chock 310. The cable 352 may communicate power and/or data between components of the wheel chock 310 and the controller 350. In another approach, the controller 350 may be wirelessly coupled to components of the wheel chock 310.

Figure 15:
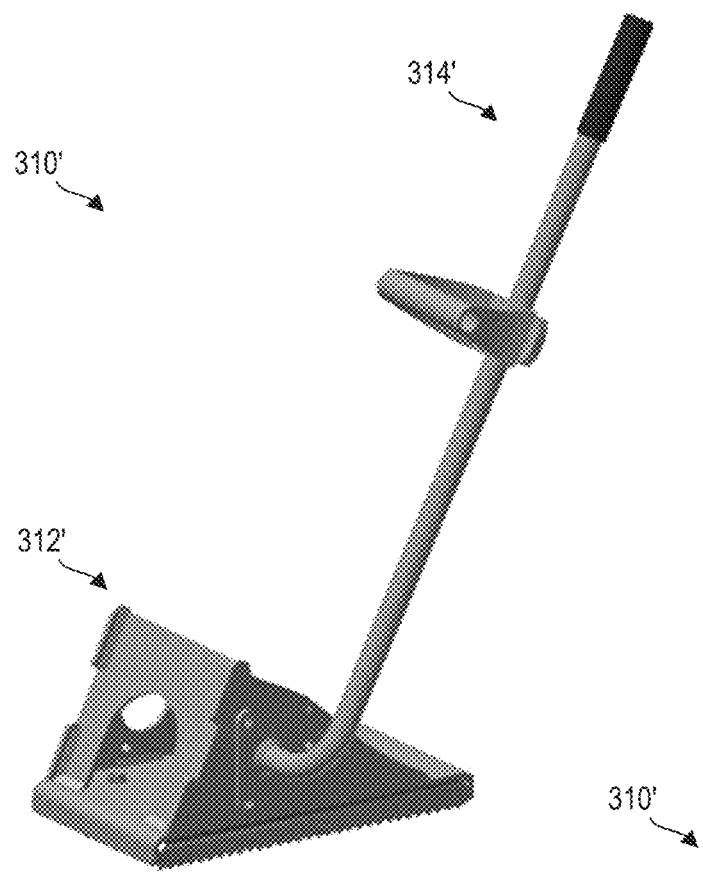
FIG. 15 is a perspective view of a wheel chock similar to the wheel chock of FIG. 14 but having an angled handle.
Figure 16:
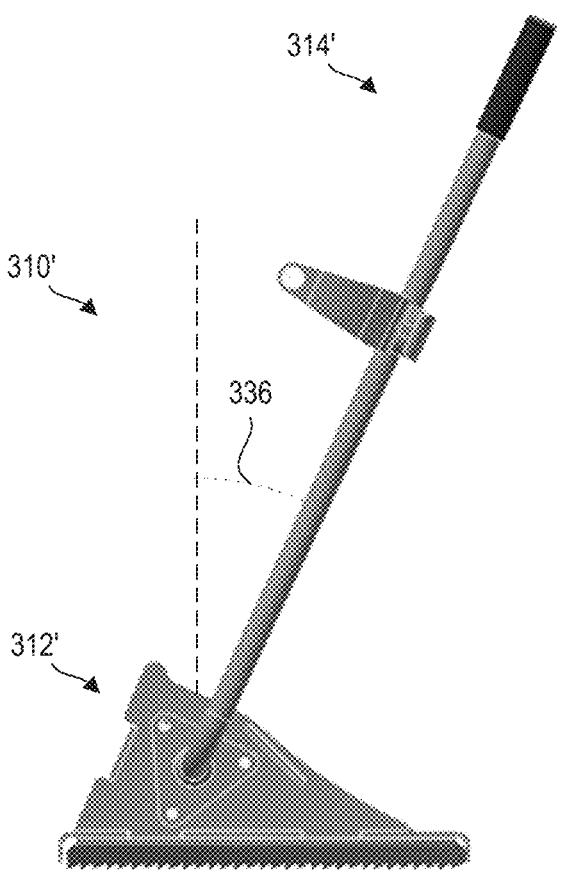
FIG. 16 is a side elevation view of the wheel chock of FIG. 15

The handle portion 314 may extend vertically from the wheel chock body 312 when the wheel chock 310 is upright, as shown in FIG. 14. In another approach, as shown in FIGS. 15 and 16, the handle portion 314' may extend at an angle, indicated at 336, from the wheel chock body 312' when the wheel chock 310 is upright. The angle may for example, in a range of about 20 to about 30 degrees (e.g., approximately 25 degrees) relative to vertical. An angled handle 314' may provide improved ergonomics when moving the wheel chock 310' into and out of position relative to a wheel 306 and/or a wheel chock station 400 (discussed below)

Figure 17:
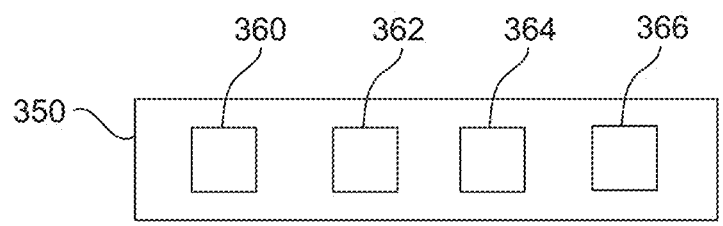
FIG. 17 is an example block diagram of a controller of FIG. 14.

As shown in FIG. 17, the controller 350 may include a memory 360, processing circuitry such as processor 362 operatively coupled to various external devices, and communication circuitry 364 communicatively coupled to various peripheral devices. Peripheral devices may include components of the loading dock system 10 discussed with respect to FIG. 1; for example, a dock door operator 12, a dock leveler 24, a gateway 60, an exterior light box 370, an interior light box 372, audible alarms such as speakers 374, 374', 374", other loading dock components 20, or a remote server computer 62. The speakers 374 may be separate interior and/or exterior components, may be integrated with an exterior light box 370 (speaker 374'), and/or may be integrated with an interior light box 372 (speaker 374"). The controller 350 may be included in, or may be in communication with, a dock control panel (e.g., control panel 46 of FIG. 1).

The controller 350 may also include a timer 366. The timer 366 may be operable, upon initiation, to increment values (e.g., time values in seconds or minutes) from a start value (e.g., "T"-plus) or decrement values from a start value (e.g., "T"-minus). For example, the timer 366 may increment from zero seconds to five seconds. As another example, the timer 366 may decrement from five seconds to zero seconds. In either approach, the timer 366 is used to measure a time period that accommodates for hysteresis in the loads applied to the wheel chock.

The controller 350 may also be operatively coupled to a light source 380 of the wheel chock 310; for example, via cable 352. As discussed in greater detail below, the light source 380 may be mounted to a body portion 312 of the wheel chock 310 and may be configured to emit light forwardly and/or rearwardly of the wheel chock 310. A light source may also or instead be supported by the handle portion 314.

Figure 18:
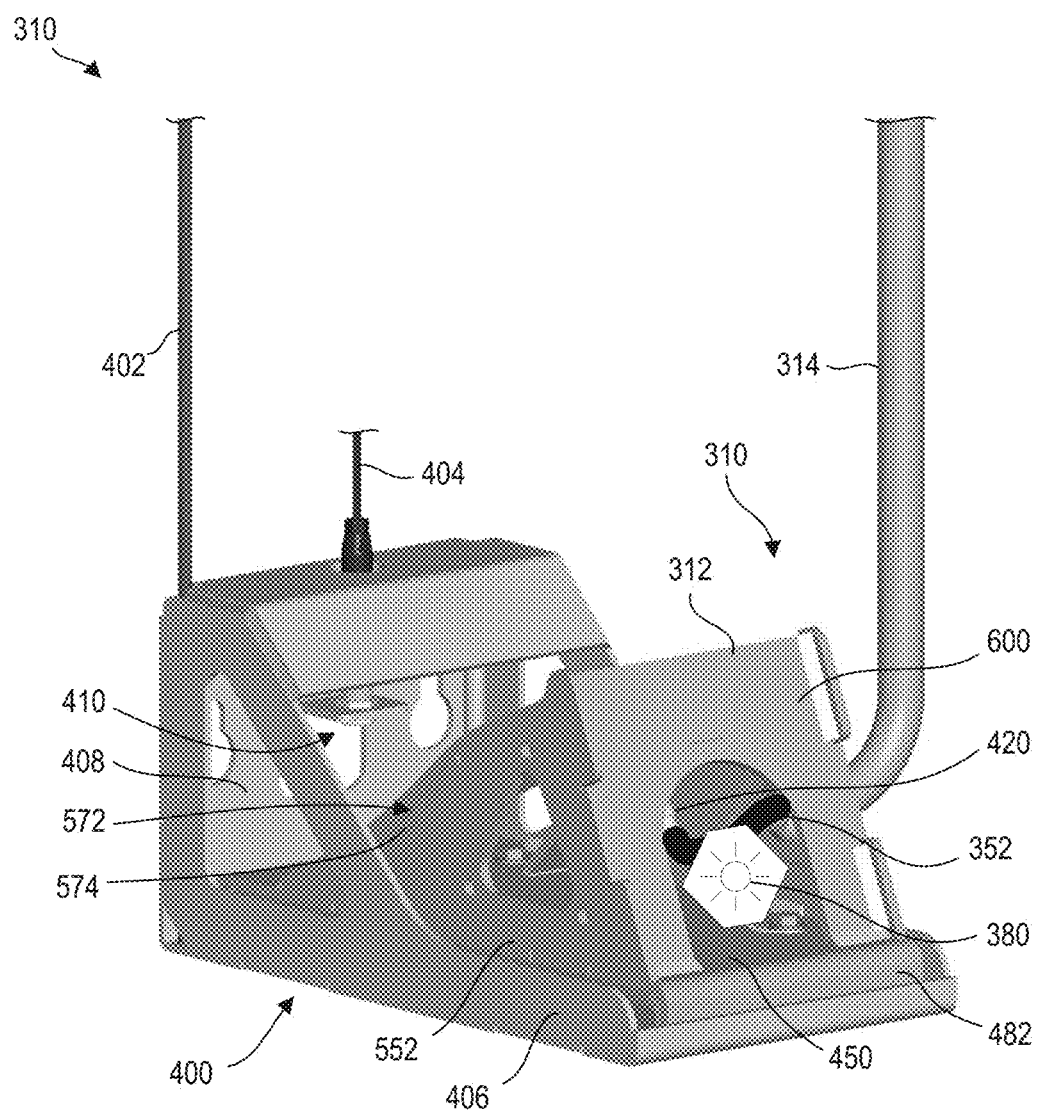
FIG. 18 is a rear perspective view of the wheel chock assembly of FIG. 14.

Referring to FIGS. 16 and 18, the wheel chock system 302 may further include a wheel chock station 400 for docking the wheel chock 310 when not used to restrain a vehicle 304. The wheel chock station 400 may include, for example, a storage bracket or a base for supporting the wheel chock 310 in an upright position to be readily used by a person at the dock. The wheel chock station 400 may be supported by a ground surface or a vertical surface adjacent a loading dock. For example, the wheel chock station 400 may include a front support 406 and a rear wall portion 408 that can be secured to a vertical surface adjacent a loading dock. The rear wall portion 408 may include, for example, one or more keyhole slots for receiving one or more fasteners that mount the wheel chock station 400 to an adjacent vertical surface.

The wheel chock station 400 may include an elongate member 402 in the form of a rod or pole that supports cable 352 in a retracted position when the wheel chock 310 is docked and in an extended position when the wheel chock 310 is chocked against a wheel 306. The elongate member 402 may be formed of fiberglass or other suitable material. As discussed in greater detail below, the controller 350 may be operatively and/or communicatively coupled to one or more components of the wheel chock station 400 via cable 404. Additionally or alternatively, the controller 350 may be wirelessly coupled to the components of the wheel chock station 400.

As shown in FIG. 18, the wheel chock 310 may be docked with the wheel chock station 400. The wheel chock station 400 may include a sensor 410 for detecting a docking status of the wheel chock 310 (e.g., based on a detected proximity of the wheel chock 310 relative to the wheel chock station 400). The sensor 410 may include an ultrasonic sensor, a laser scanner, a capacitive displacement sensor, an eddy-current sensor, a magnetic sensor, a radar sensor, a lidar sensor, a sonar sensor, or the like.

In one approach, the controller 350 is configured to change a status of the light source 380 based at least in part on a change of the docking status of the wheel chock 310 as determined at least in part by the sensor 410. The docking status may include an undocked status with the wheel chock 310 positioned outside of the wheel chock station 400, and a docked status with the wheel chock 310 received in the wheel chock station 400.

The controller 350 is configured to cause the light source 380 to emit more light upon the sensor 410 detecting an undocked status than upon the sensor 410 detecting a docked status. For example, the controller 350 may be configured to cause the light source 380 to emit no light upon the sensor 410 detecting a docked status. The controller 350 may be configured to change the light source 380 from an "off" condition to an "on" condition in response the wheel chock 310 being removed from the wheel chock station 400. The controller 350 may also be configured to change the light source 380 from an "on" condition to an "off" condition in response to the wheel chock 310 being docked with the wheel chock station 400. As used herein, a light source 380 in an "on" condition emits more light (e.g., is brighter) than when in an "off" condition.

When the light source 380 is in the "on" condition, the light source 380 may illuminate a ground surface 84 of the loading dock area. In this way, illumination of the light source 380 may assist an operator in moving and placing the wheel chock 310 relative to a wheel 306 of a vehicle 304 particularly when ambient lighting is low.

Figure 21:
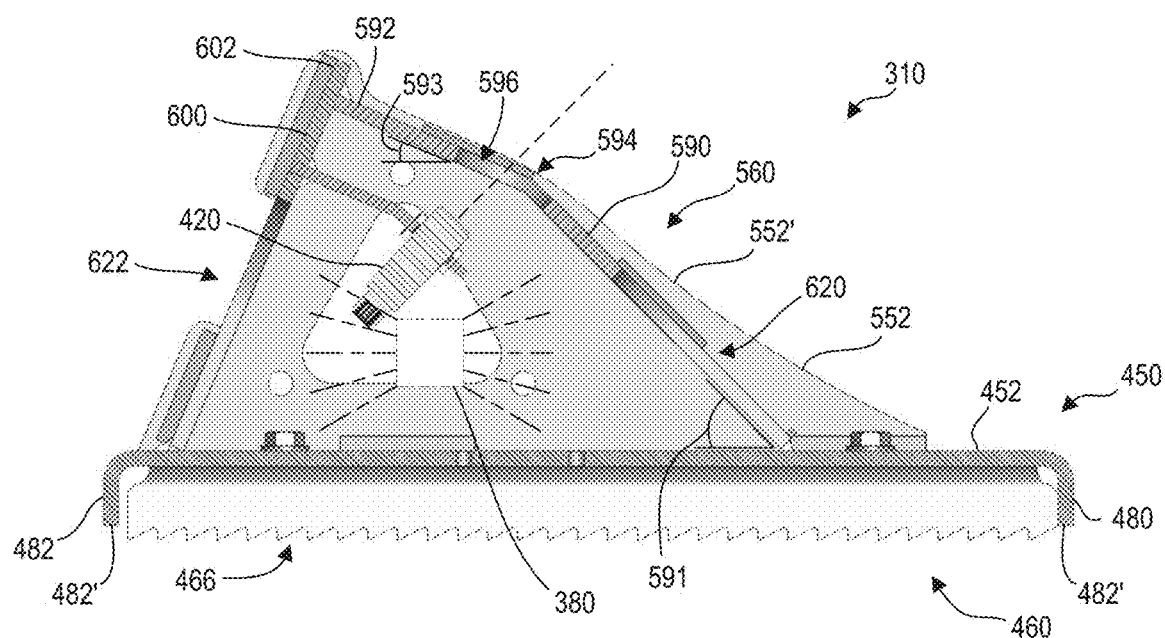
FIG. 21 is a cross-sectional view taken along line 20-20 of FIG. 19.

Referring to FIG. 21, the wheel chock 310 includes a sensor 420. The sensor 420 may be configured to detect a proximity of a wheel 306. The sensor 420 may include an ultrasonic sensor, a laser scanner, a capacitive displacement sensor, an eddy-current sensor, a magnetic sensor, a radar sensor, a lidar sensor, a sonar sensor, or the like.

Figure 25:
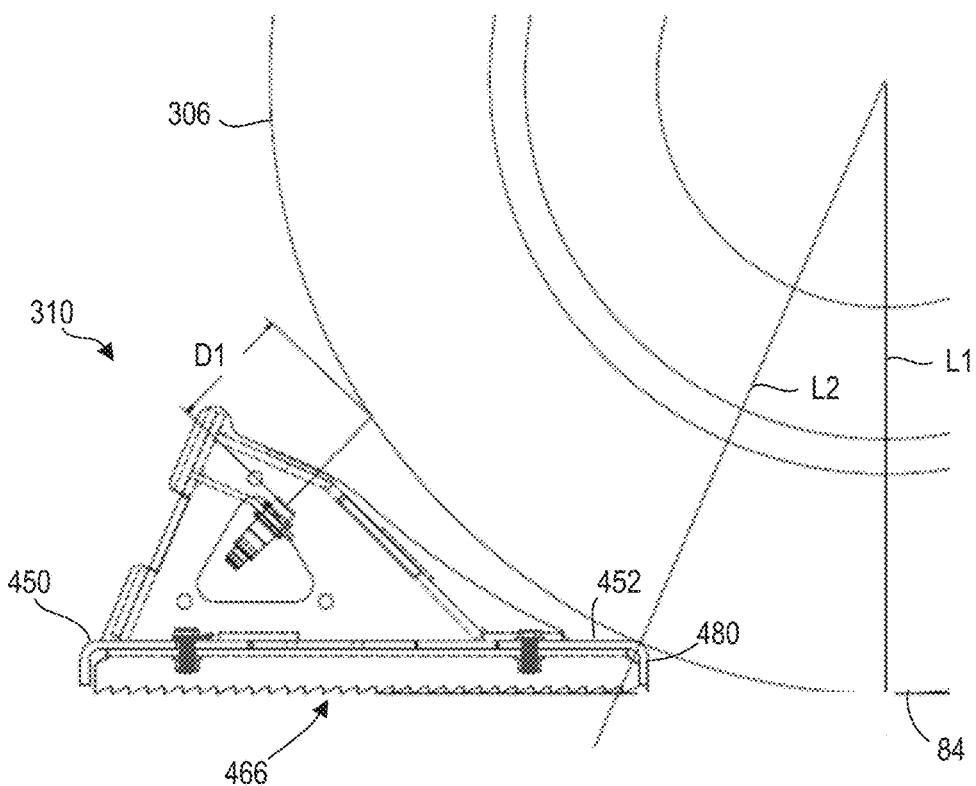
FIG. 25 is a first force diagram showing a first wheel having a first diameter in an initial engagement position with the wheel chock of FIG. 19.
Figure 26:
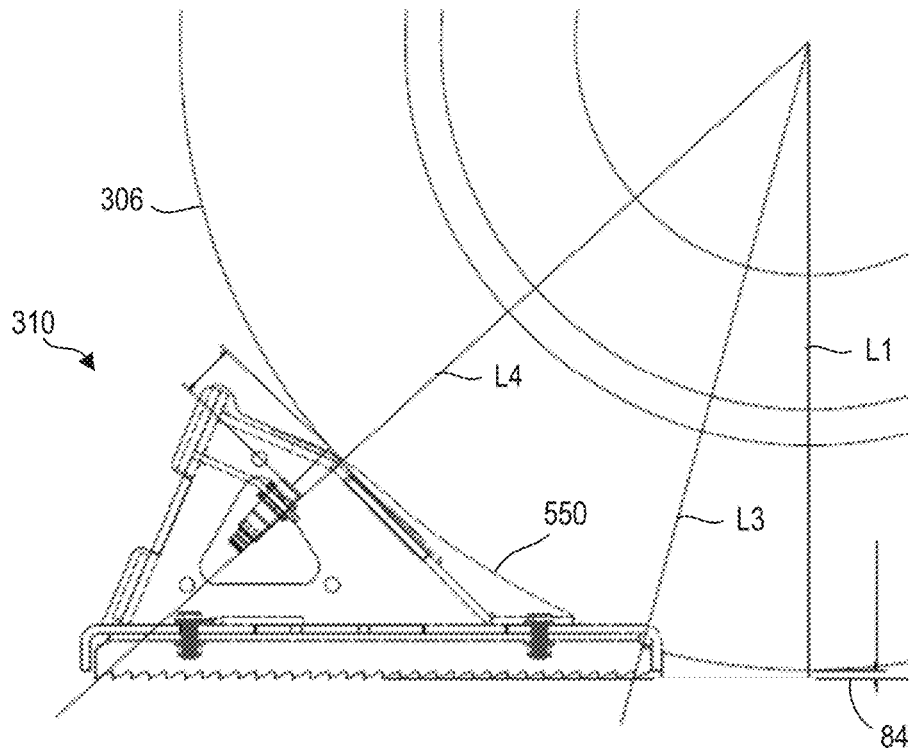
FIG. 26 is a second force diagram showing the first wheel in a first pullout position with the wheel chock of FIG. 19.
Figure 27:
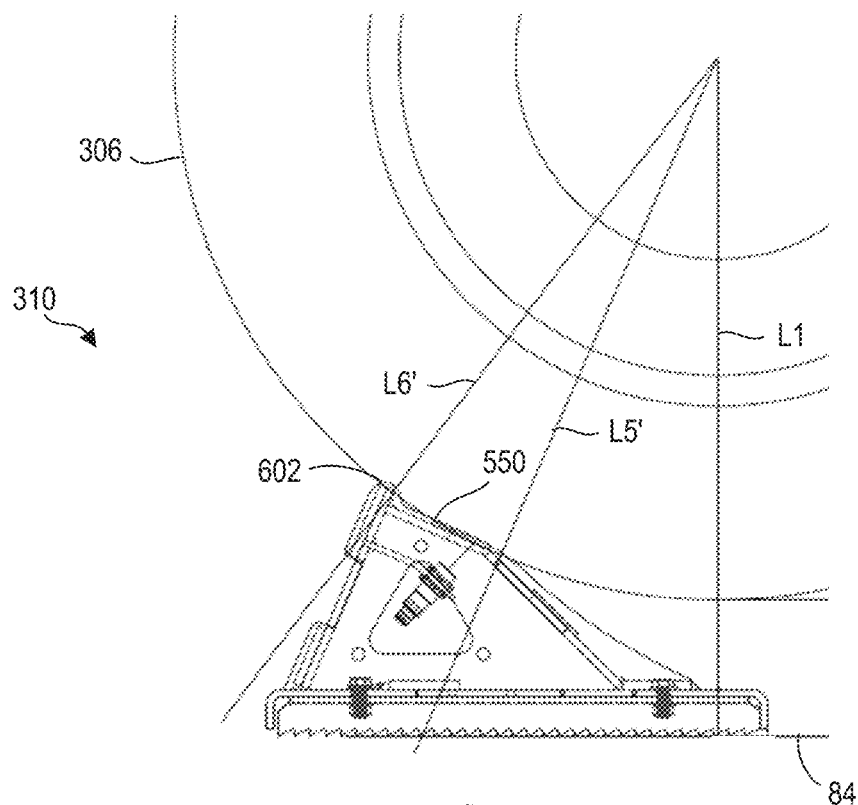
FIG. 27 is a third force diagram showing the first wheel in a second pullout position with the wheel chock of FIG. 19.
Figure 28:
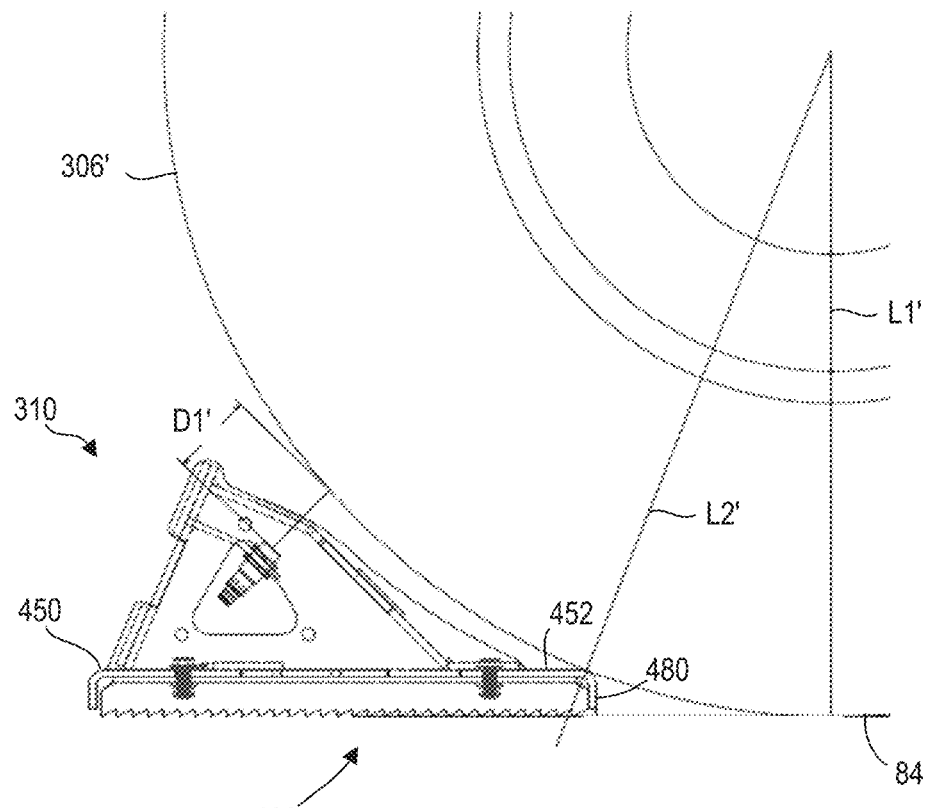
FIG. 28 is a fourth force diagram showing a second wheel having a second diameter larger than the first wheel in an initial engagement position with the wheel chock of FIG. 19.
Figure 29:
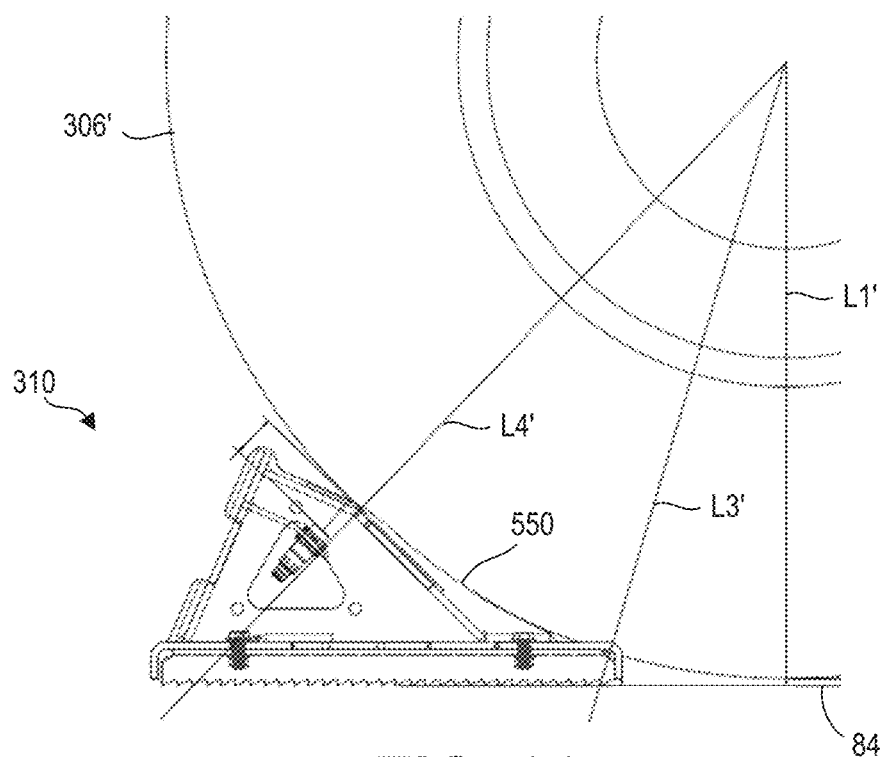
FIG. 29 is a fifth force diagram showing the second wheel in a first pullout position with the wheel chock of FIG. 19.
Figure 30:
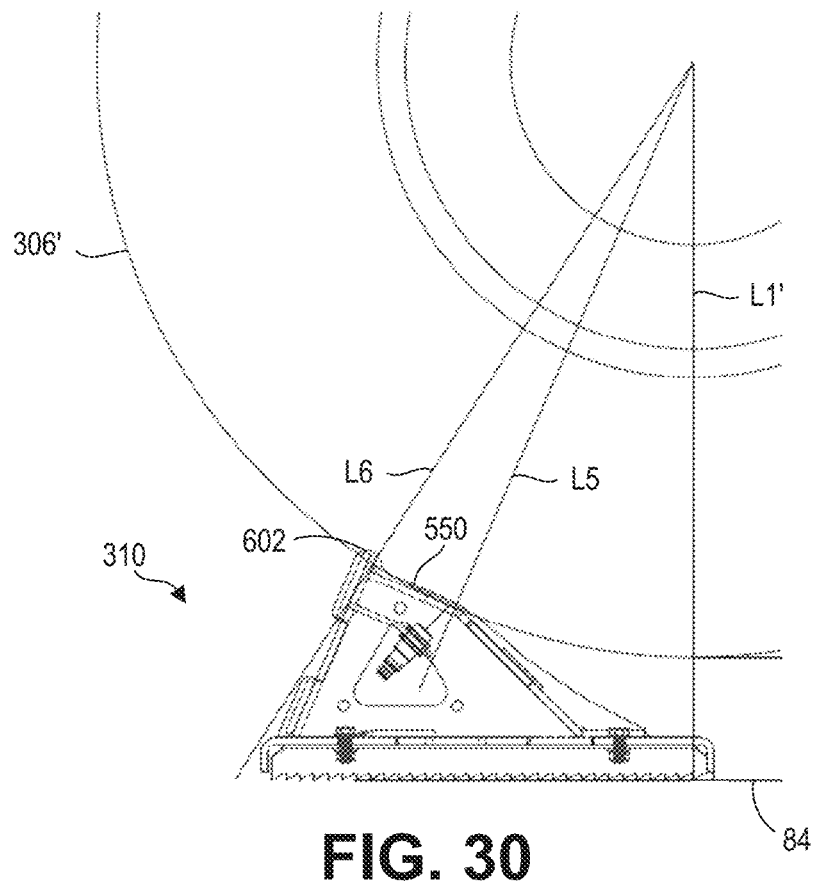
FIG. 30 is a sixth force diagram showing the second wheel in a second pullout position with the wheel chock of FIG. 19.

FIGS. 25-27 show a first wheel 306 having a diameter of approximately 35 inches. FIGS. 28-30 show a second wheel 306' having a diameter of approximately 42.5 inches. FIGS. 25-30 show the wheels 306, 306' moving from a properly chocked position (FIGS. 25 and 28), to a first pullout condition (FIGS. 26 and 29), and to a second pullout condition (FIGS. 27 and 30). Lines L1, L1' indicate a centerline of the respective wheels 306, 306'. Lines L2, L2' indicate a line of action resulting from the weight and forward movement of the vehicle 304 when the respective wheels 306, 306' make contact with the wheel chock 310. Lines L3, L3' indicate a line of action of the weight and forward movement of a vehicle 304 when the respective wheel 306, 306' makes contact with the wheel chock 310. Lines L4, L4' indicate a line of action of the weight and forward movement of a vehicle 304 when the respective wheel 306, 306' makes contact with the transition region 594 of the transverse plate 560 of the wheel chock 310 in the second pullout condition. Lines L5, L5' indicate a line of action of the weight and forward movement of a vehicle 304 at the transition region 594 when the respective wheel 306, 306' is in the second pullout condition. Lines L6, L6' indicate a line of action of the weight and forward movement of a vehicle 304 at the stop portion 602 of the backplate 600 of the wheel chock 310 when the wheel 306, 306' is in the second pullout condition.

With reference to FIGS. 25 and 28, the sensor 420 is configured to detect when the wheel 306 is within a first proximity (e.g., a first wheel distance from the sensor 420) that may be indicative of a proper chock position of the wheel chock 310 relative to a wheel 306. The first proximity may be a distance D1, D1' within a predefined range from the sensor 420 to the wheel 306. The predefined range may be, for example, approximately two to approximately six inches or any range or value therebetween.

In response to the sensor 420 detecting the wheel 306 is within the first proximity, the controller 350 is configured to execute first instructions. The first instructions may include causing a peripheral device to have a first state in response to the sensor 420 detecting the wheel 306 within the first proximity. The peripheral device may be a notification apparatus that outputs a first alert (e.g., a first user alert via exterior light box 370, interior light box 372, light source 380, and/or a speaker 374, 374', 374"), a dock leveler 24, or a movable barrier operator 12. For example, the controller 350 may be configured to flash light source 380 (e.g., increase and decrease the intensity of the light source 380) one or more times to indicate the wheel 306 is within a predefined range from the sensor 420 indicative of a proper wheel chock engagement.

With reference to FIGS. 26 and 29, the sensor 420 is further configured to detect when a wheel 306 is within a second proximity (e.g., a second wheel distance from the sensor 420) that is less than the first proximity. The detected second proximity may be indicative of a "pullout" condition of a vehicle 304. As used herein, a "pullout" condition refers to movement of the vehicle 304 away from the loading dock prior to removal or disengagement of a vehicle restraint such as a wheel chock 310 from the vehicle 304. A pullout condition may be caused, for example, due to a driver of the vehicle 304 driving the vehicle 304 away from the loading dock, due to loading dock equipment such as a forklift causing the vehicle 304 to push away from the loading dock (also referred to as "trailer creep"), or due to gravity pulling the vehicle 304 away from the loading dock. The second proximity may be, for example, less than two inches. Upon detecting the wheel 306 is within the second proximity, the controller 350 (e.g., via the processor 362) is configured to initiate the timer 366. As discussed, the timer 366 may increment or decrement values to reach a predetermined time value. The predetermined time value may be two seconds or more (e.g., in the range of approximately two seconds to approximately ten seconds).

Upon the timer 366 reaching the predetermined value while the wheel 306 remains within the second proximity relative to the sensor 420, the controller 350 (e.g., via the processor 362) is configured to execute second instructions. The second instructions may include causing a peripheral device to transition to a second state, which may include effecting a second alert (e.g., a second user alert). The second alert may be different than the first alert. For example, the first alert may include effecting illumination of the light source 380 of the wheel chock 310, and the second alert may include effecting a second illumination of the light source 380 (e.g., at a different brightness or flash frequency) and/or effecting actuation of one or more of one or more of exterior light box 370, interior light box 372, and speaker 374. In one approach, the first instructions may include causing the light source 380 to flash one time to indicate a proper chock position, and the second instructions may include causing the light source 380 to flash two or more times to indicate a pullout condition.

Figure 22:
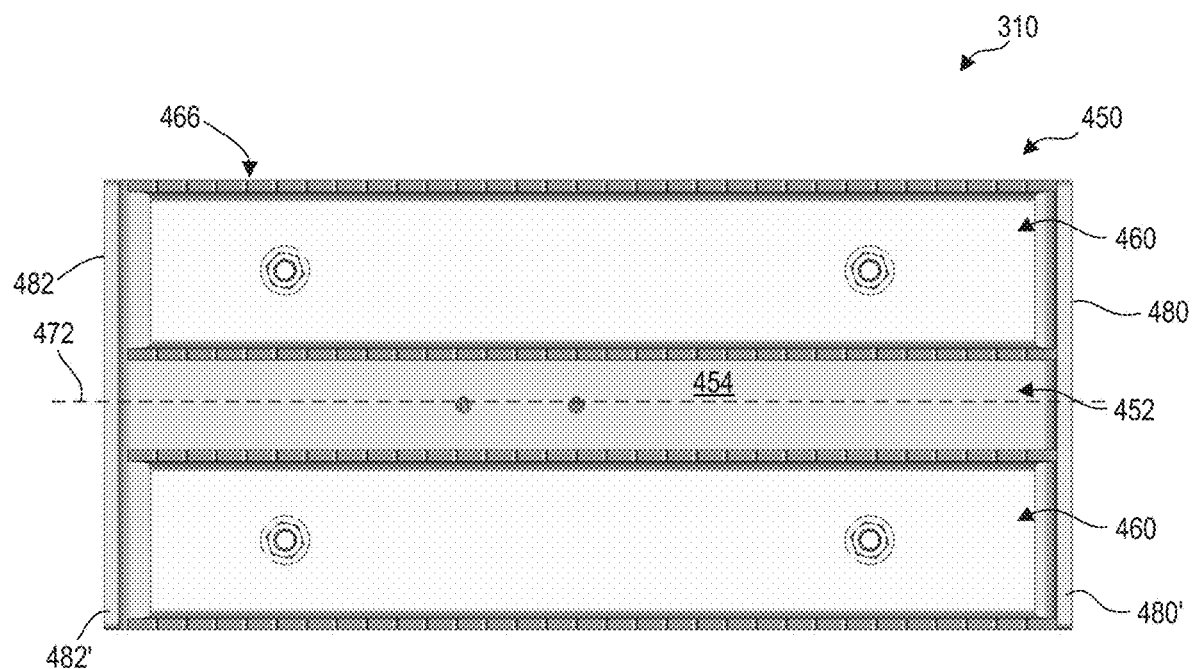
FIG. 22 is a bottom plan view of the wheel chock of FIG. 19.
Figure 23:
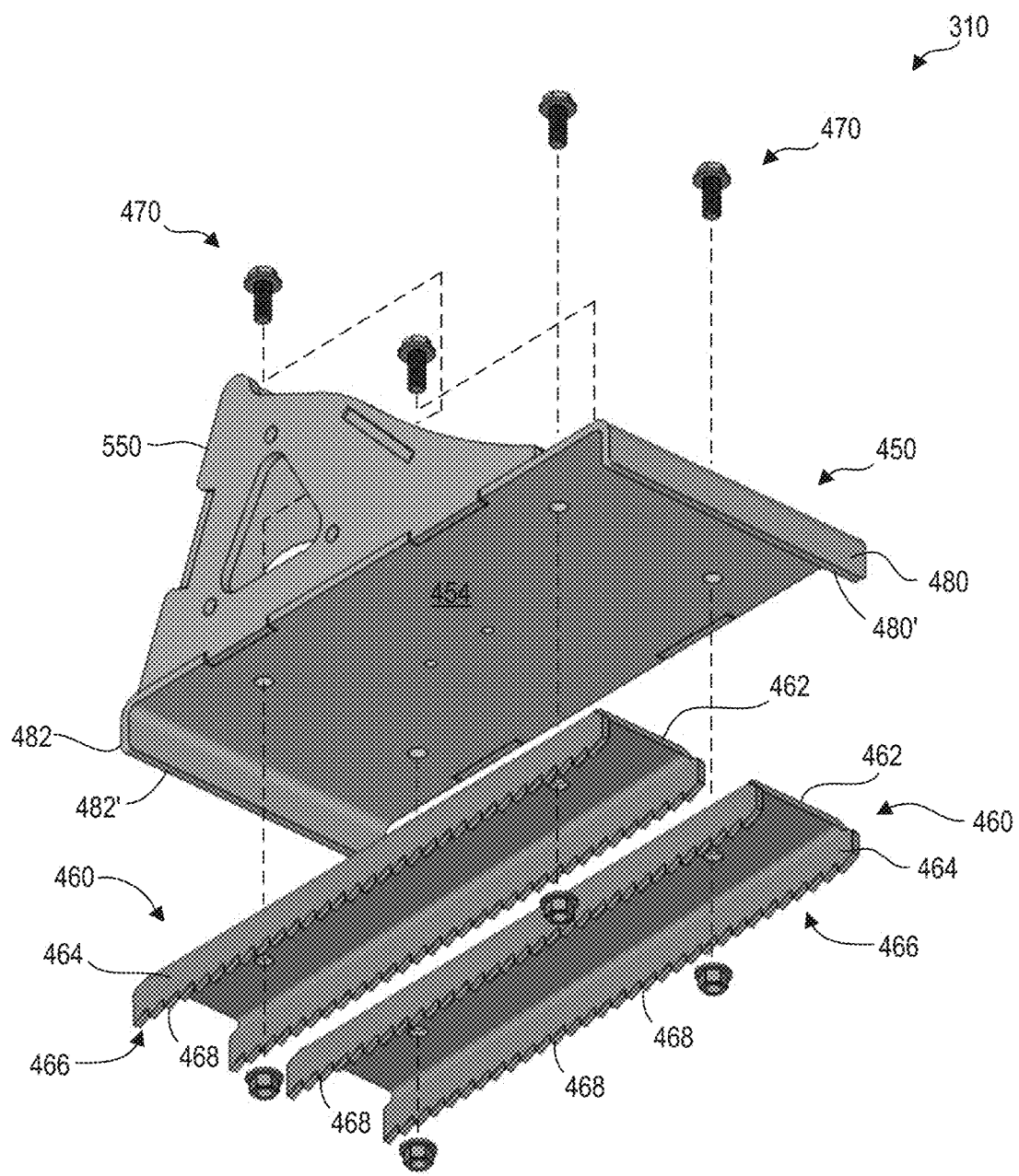
FIG. 23 is an exploded view of the wheel chock of FIG. 19 showing toothed cartridges of the wheel chock separated from a body of the wheel chock.

Referring to FIGS. 19-23, the wheel chock body 312 includes a chock base 450. The chock base 450 may be in the form of a lower wall 452 that includes a generally planar portion 456. As shown in FIGS. 22 and 23, the lower wall 452 includes a downwardly-facing surface 454 that faces a ground surface (e.g., ground surface 84 of FIG. 1) when the wheel chock body 312 is in an upright orientation.

The lower wall 452 receives one or more replaceable supports such as cartridges 460 that are removably securable to the downwardly-facing surface 454 of the lower wall 452. More particularly, and with reference to FIG. 23, the cartridges 460 include upper walls or surfaces 462 and sidewalls or side edges 464 that include downwardly-projecting teeth 466 extending opposite the upper surface 462. The cartridges 460 may include rows of teeth 466. The teeth 466 include lower tips 468 that engage a ground surface 84. In one approach, the wheel chock body 312 receives a single replacement cartridge 460. In another approach, wheel chock body 312 receives a plurality of replacement cartridges 460 arranged in an adjacent manner (e.g., first and second cartridges 460 arranged in contact or spaced apart).

The upper surfaces 462 and side edges 464 of the replaceable cartridges 460 cooperate to form a generally U-shaped cross-section. The downwardly-projecting teeth 466 grip a ground surface 84 to limit or inhibit lateral movement of the wheel chock 310 relative to the ground surface 84 during a pullout event of the vehicle 304. With the replaceable cartridges 460 secured to the wheel chock body 312, the wheel chock body 312 is supported on the upper surfaces 462 of the replaceable cartridges 460.

In one approach, the cartridges 460 are removably securable to the downwardly-facing surface 454 of the lower wall 452 with one or more removable fasteners 470 (FIG. 23). When secured to the lower wall 452, the replaceable cartridges 460 extend along (e.g., parallel to) a fore-and-aft axis 472 (FIG. 22) of the downwardly-facing surface 454 of the wheel chock body 312.

The chock base 450 may further include a forward lip 480 that extends downwardly from the downwardly-facing surface 454. The chock base 450 may also or instead include a rearward lip 482 that extends downwardly from the downwardly-facing surface 454. With a replaceable cartridge 460 installed on the lower wall 452, one or both of the forward lip 480 and the rearward lip 482 extends downwardly along the replaceable cartridge 460. In one approach, the forward lip 480 and/or the rearward lip 482 extends downwardly along less than the full height of the replaceable cartridge 460. In this way, one or both of the forward lip 480 and the rearward lip 482 provides a stop surface 480', 482' (FIGS. 20-23) that limits the depth of penetration or insertion of the downwardly-projecting teeth 466 of the replaceable cartridge 460 into the ground surface 84 due to the forces imparted by a wheel 306 rolling up onto the wheel chock body 312.

In one approach, one or both of the forward lip 480 and the rearward lip 482 abuts a replaceable cartridge 460. In this way, lateral forces applied by the wheel 306 to the wheel chock body 312 may be transferred from a lip 480, 482 to the replaceable cartridge 460 such that shear forces at fasteners 470 are reduced.

Referring to FIGS. 25 and 28, when the wheel chock 310 is placed in a proper chock position, chock base 450 interfaces the wheel 306 of a vehicle 304 proximate the junction of the lower wall 452 and the forward lip 480. The downwardly-projecting teeth 466 grip the ground surface 84 to limit or inhibit lateral movement of the wheel chock 310 relative to the ground surface 84.

Figure 24:
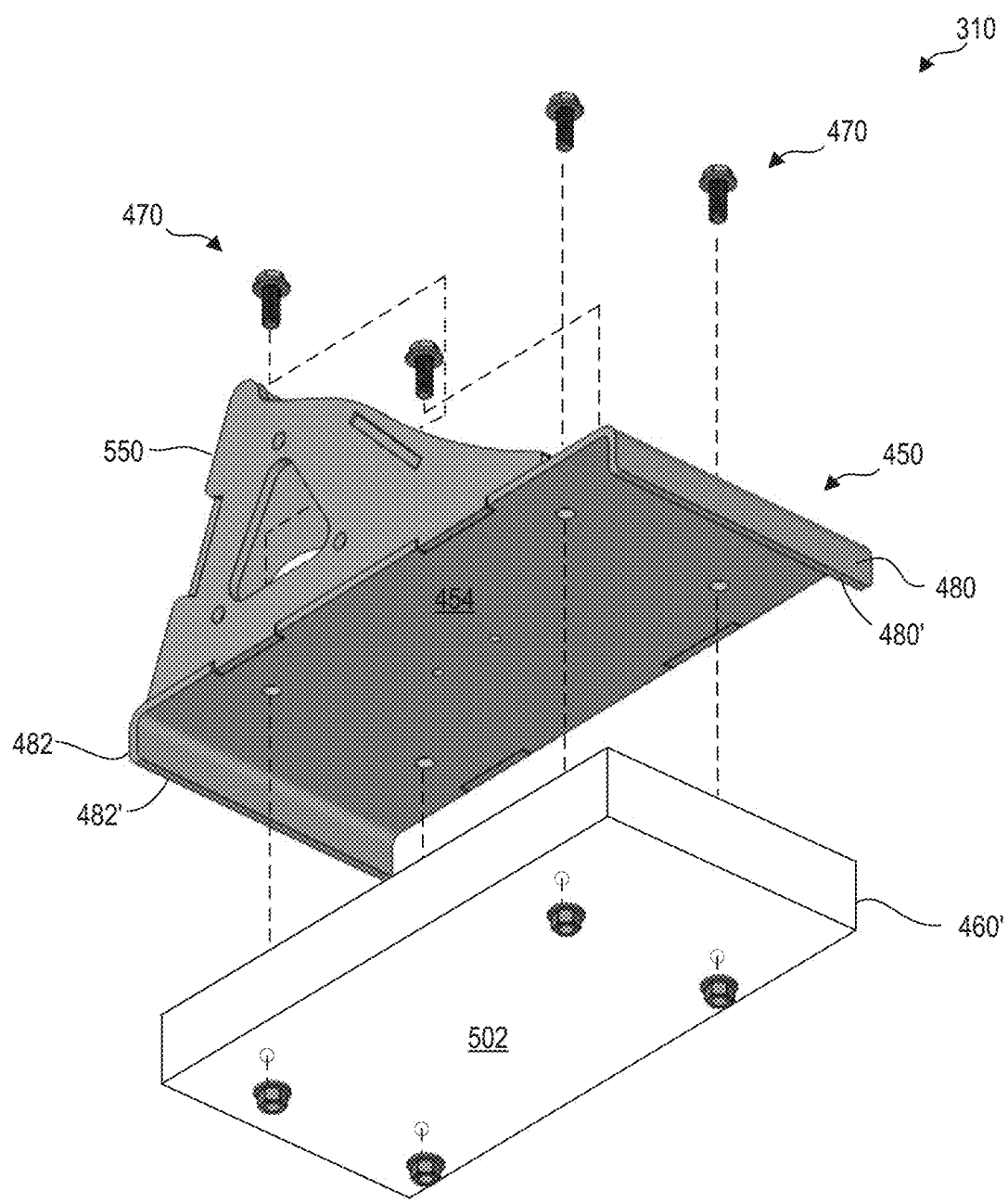
FIG. 24 is an exploded view of a wheel chock similar to the wheel chock of FIG. 23 but showing an elastomeric pad cartridge of the wheel chock separated from a body of the wheel chock.

Referring to FIG. 24, replaceable supports may include cartridge pads 460'. The cartridge pads 460' may be generally elastomeric (e.g., rubber) or otherwise be formed of a material with a high gripping or friction coefficient and low inherent lubricity, and may be secured to the downwardly-facing surface 454 of the lower wall 452 with fasteners 470 in a similar manner as discussed with respect to the cartridges 460. In one approach, the cartridge pad 460' may be a unitary pad. In other approaches, the cartridge pad 460' may be multiple, discrete cartridge pads secured to the wheel chock body 312. The lower surface 502 of the cartridge pad 460' that interfaces a ground surface 84 may be generally planar, or may be discontinuous (e.g., rigid, rolling, stepped, cleated/studded). The cartridge pad 460' may be utilized, for example, in environments in which the downwardly-projecting teeth 466 of the cartridges 460 may be undesirably detrimental to a ground surface 84.

Referring again to FIGS. 19-23, the wheel chock 310 includes a first vertical sidewall plate 550 and a second vertical sidewall plate 552 that extend upwardly from the chock base 450 along opposing peripheral edges 450', 450" of the chock base 450 (FIG. 20). The first and second vertical sidewall plates 550, 552 include upward-facing edge surfaces 550', 552'.

The wheel chock 310 further includes a front face, which may be a transverse plate 560, that interfaces (e.g., engages) a wheel 306. The transverse plate 560 extends between the first vertical sidewall plate 550 and the second vertical sidewall plate 552. The transverse plate 560 may extend, for example, from contact with the first vertical sidewall plate 550 to contact with the second vertical sidewall plate 552.

Figure 19:
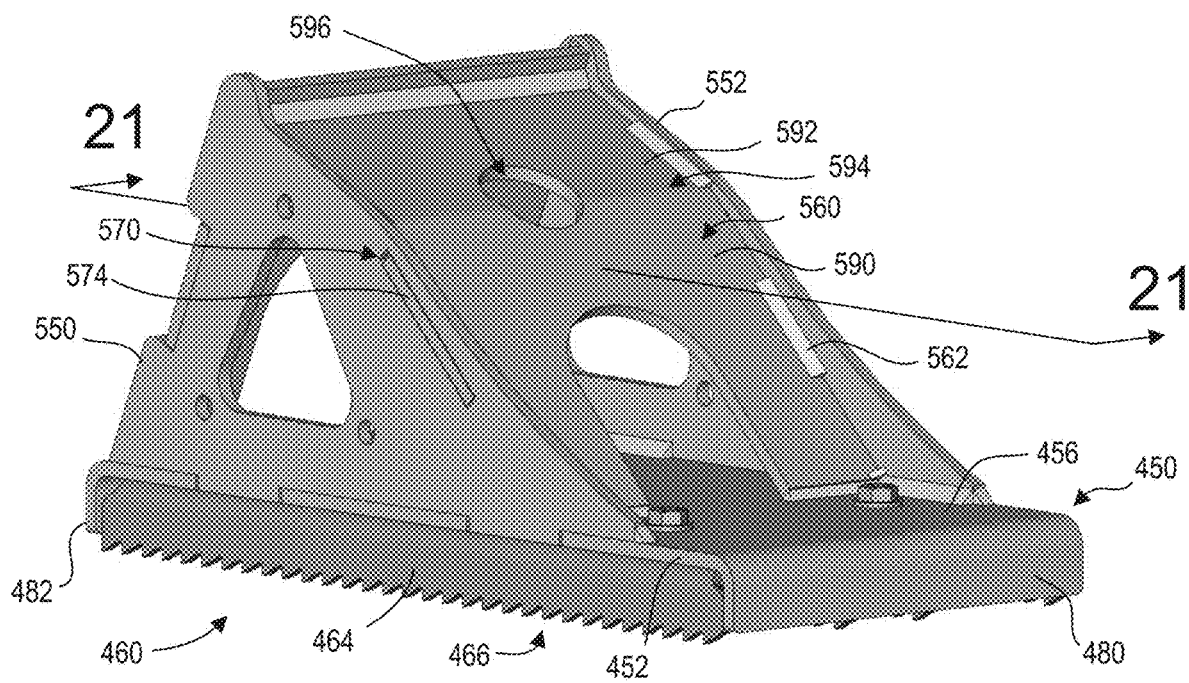
FIG. 19 is a front perspective view of the wheel chock of FIG. 14 removed from the wheel chock station and with a handle portion of the wheel chock removed for clarity.

As shown in FIGS. 18 and 19, one or both of the first vertical sidewall plate 550 and the second vertical sidewall plate 552 may include an opening 570, 572 therethrough. The transverse plate 560 may include protrusions or tabs 574 that are received in the openings 570, 572 to facilitate assembly of the wheel chock body 312. In another approach, the transverse plate 560 may include one or more openings, and one or both of the first and second vertical sidewall plates 550, 552 may include protrusions or tabs.

With the wheel chock body 312 assembled, the transverse plate 560 may be secured to the first vertical sidewall plate 550 and the second vertical sidewall plate 552. For example, the transverse plate 560 may be welded (e.g., via one or more fillet welds 562) at a first edge 560' to the first vertical sidewall plate 550 and welded at a second edge 560" opposite first edge 560' to the second vertical sidewall plate 552. In this way, the first vertical sidewall plate 550, the second vertical sidewall plate 552, and the transverse plate 560 cooperate to form a wedge portion above the chock base 450 to limit movement of a wheel 306.

Figure 20:
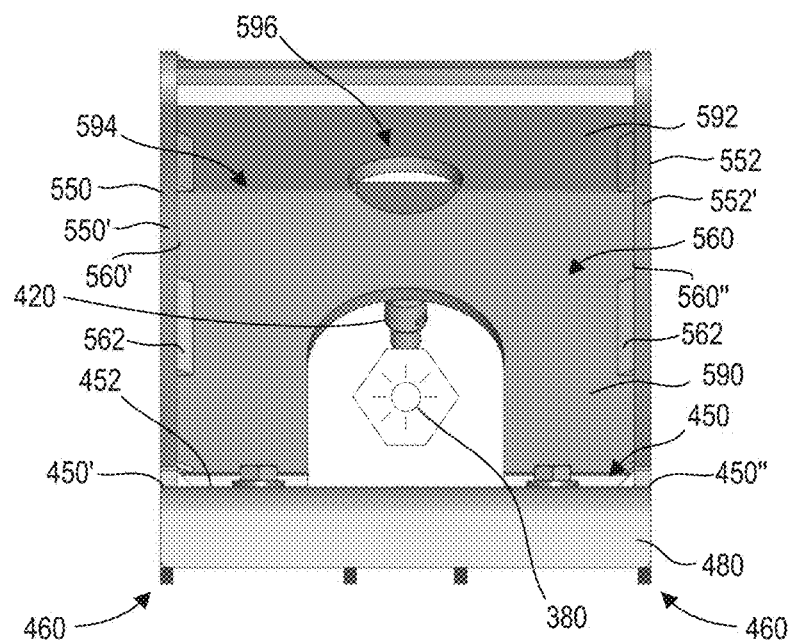
FIG. 20 is a front elevation view of the wheel chock of FIG. 19.

With reference to FIGS. 19-21, in one approach, the transverse plate 560 includes a first ramp portion 590 and a second ramp portion 592. One or both of the first and second ramp portions 590, 592 may be planar ramp portions. The first ramp portion 590 may extend upwardly at a first angle 591 relative to the chock base 450 (e.g., at least 35 degrees relative to the chock base 450 or ground surface 84). The second ramp portion 592 may extend from the first portion 590 at a transition 594, which may be a transition edge. The second ramp portion 592 may extend obliquely from the first portion 590 at a second angle 593 less than the first angle relative to the chock base 450 or ground surface 84. For example, the second ramp portion 592 may extend in the range of approximately 15 degrees to approximately 40 degrees relative to horizontal (e.g., the chock base 450 or ground surface 84), and more particularly, in the range of approximately 20 to approximately 25 degrees. In this way, the angle of the second ramp portion 592 relative to the ground may be selected to apply sufficient downward force on the wheel chock 310 to prevent slippage with respect to the ground. More particularly, during a pullout condition with a wheel 306 supported on the second ramp portion 592, the second ramp portion 592 directs the load from the wheel downward to engage the teeth 466 with the ground and prevent the wheel chock 310 from sliding on the ground surface 84 when the horizontal force from forward movement of the vehicle 304 is applied to the wheel chock 310.

As shown in FIG. 21, the transverse plate 560 may include an aperture 596. The aperture 596 may be configured near the transition 594 such that the aperture 596 extends through both of the first and second ramp portions 590, 592. The sensor 420 may be secured within the wheel chock body 312 such that the sensor 420 is oriented toward, into, or through the aperture 596. More particularly, the sensor 420 may be oriented through the aperture 596 above the transition 594.

The wheel chock 310 may further include a rear face or backplate 600 that extends from the chock base 450 toward the transverse plate 560. The backplate 600 may include a stop portion 602 that extends upwardly beyond the transverse plate 560 such that the backplate 600 interfaces a wheel 306 in a second pullout condition (shown in FIGS. 27 and 30). In one approach, the stop portion 602 extends generally orthogonally to an upper portion of the transverse plate 560.

As shown in FIG. 21, the transverse plate 560 may include a forward aperture 620, and the backplate 600 may include a rear aperture 622. Actuation of the light source 380 (e.g., via controller 350) may cause the light source 380 to emit light in a generally forward and/or rearward direction of the wheel chock 310 through one or both of the apertures 620, 622. Aperture 622 may also permit a user to access (e.g., assemble, repair, etc.) various components of the wheel chock 310 such as chock sensor 480, handle 344, and cartridges 460.

When the wheel chock 310 is in a chocked position during vehicle pullout condition, shown for example in FIGS. 26, 27, 29, and 30, the wheel 306 of the vehicle 304 rolls up on the first and second vertical sidewall plates 550, 552. More particularly, the wheel 306 rolls up on upward-facing edge surfaces 550', 552' (FIG. 20) of the first and second vertical sidewall plates 550, 552. The first and second vertical sidewall plates 550, 552 are configured to transfer load vertically from the upward-facing edge surfaces 550', 552' to the chock base 450 (e.g., at the lower wall 452) with the wheel 306 engaged with the upward-facing edge surfaces 550', 552' and spaced from at least a portion of the transverse plate 560. As discussed, the angle of the second ramp portion 592 relative to the ground may be selected to apply sufficient downward force on the wheel chock 310 to prevent slippage with respect to the ground.

The above description is merely exemplary, and those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept. It is intended that the phrase "at least one of" as used herein be interpreted in the disjunctive sense. For example, the phrase "at least one of A and B" is intended to encompass A, B, or both A and B.

What is claimed is:

1. A wheel chock system comprising:
   a wheel chock including a sensor configured to detect a proximity of a wheel; and
   a controller operably coupled to the sensor and a peripheral device, the controller including a processor configured to:
   cause the peripheral device to have a first state in response to the sensor detecting the wheel within a first proximity;
   initiate a timer in response to the sensor detecting the wheel within a second proximity, wherein the second proximity is indicative of a pullout condition whereby the wheel moves in a direction away from the wheel chock; and
   cause the peripheral device to transition to a second state in response to the sensor detecting the wheel within the second proximity for a predetermined time period measured by the timer.

2. The wheel chock system of claim 1 wherein the wheel chock comprises:
   a bottom surface;
   a first surface portion inclined relative to the bottom surface to support the wheel at a first height above the bottom surface upon the wheel being at the first proximity; and
   a second surface portion inclined relative to the first surface portion, the second surface portion configured to support the wheel at a second height above the bottom surface that is higher than the first height upon the wheel being at the second proximity.

3. The wheel chock system of claim 1 wherein the predetermined time period is two seconds or more.

4. The wheel chock system of claim 1 wherein the wheel chock includes the peripheral device, the peripheral device comprising a notification apparatus; and wherein the notification apparatus outputs an alert with the peripheral device in the second state.

5. The wheel chock system of claim 1 wherein the second proximity is less than the first proximity.

6. The wheel chock system of claim 1 wherein the processor is configured to cause the peripheral device to have the first state by causing the peripheral device to effect a first user alert; and
wherein the processor is configured to cause the peripheral device to transition to the second state by causing the peripheral device to effect a second user alert different than the first user alert.

7. The wheel chock system of claim 1 in combination with the peripheral device, wherein
the peripheral device comprises at least one of:
a light;
a speaker;
a dock leveler; and
a movable barrier operator.

8. The wheel chock system of claim 1 wherein the first proximity is in a range of about two to about six inches; and
wherein the second proximity is less than two inches.

9. A wheel chock system comprising:
a wheel chock including a light source disposed on the wheel chock;
a wheel chock station configured to receive the wheel chock, the wheel chock station including a sensor configured to detect a docking status of the wheel chock; and
a controller operably coupled to the light source and the sensor, the controller configured to operate the light source based at least in part on the docking status of the wheel chock.

10. The wheel chock system of claim 9 wherein the controller is configured to change a state of the light source based at least in part on a change of the docking status of the wheel chock.

11. The wheel chock system of claim 9 wherein the docking status comprises an undocked status upon detection by the sensor of the wheel chock positioned outside of the wheel chock station and a docked status upon detection by the sensor of the wheel chock received in the wheel chock station; and
wherein the controller is configured to cause the light source to emit more light upon the sensor detecting the undocked status than upon the sensor detecting the docked status.

12. The wheel chock system of claim 11 wherein the controller is configured to cause the light source to emit no light upon the sensor detecting the docked status.

13. The wheel chock system of claim 9 wherein the wheel chock includes a front face to engage a wheel, a rear face opposite the front face; and
wherein the light source is configured to emit light from at least one of the front face and the rear face.

14. The wheel chock system of claim 9 wherein the wheel chock includes a body having a front surface to be positioned adjacent a wheel, and a handle connected to the body; and
wherein the handle includes the light source.

15. The wheel chock system of claim 9 wherein the wheel chock station includes a front support to receive the wheel chock and a rear wall portion configured to be secured to a vertical surface adjacent a loading dock.

16. The wheel chock system of claim 9 wherein the controller comprises a dock controller panel configured to control a plurality of peripheral devices of a dock including at least one of:
a light;
a speaker;
a dock leveler; and
a movable barrier operator.

17. A wheel chock assembly comprising:
a body having a base and a wedge portion above the base to limit movement of a wheel;
a sensor supported by the body to detect a proximity of the wheel to the wedge portion; and
a support below the base of the body and supporting the body, the support removably connected to the base of the body and including an elastomeric body to engage a surface adjacent a wheel and resist movement of the support and body connected thereto.

18. The wheel chock assembly of claim 17 wherein the support includes a plurality of teeth that extend below the base to engage the surface.

19. The wheel chock assembly of claim 18 wherein the support comprises a plurality of supports and the teeth comprise rows of teeth of each of the supports.

20. The wheel chock assembly of claim 18 wherein the teeth include lower tips that engage the surface; and
wherein the base of the body includes at least one stop surface above the lower tips of the teeth configured to limit a distance the teeth penetrate into the surface upon the wheel rolling up onto the wedge portion.

21. The wheel chock assembly of claim 18 wherein the base of the body has a lower surface;
wherein the support has an upper wall to support the base lower surface; and
wherein the support includes a pair of side walls depending from the upper wall, the side walls having free end portions that include the teeth.

22. The wheel chock assembly of claim 17 wherein fasteners removably connect the support and the body.

23. The wheel chock assembly of claim 17 wherein the base comprises a bottom wall and forward lip depending from the bottom wall forward of the wedge portion; and
wherein the support contacts the forward lip of the base to resist relative movement of the body and the support.

24. The wheel chock assembly of claim 23 wherein the base further comprises a rearward lip depending from the bottom wall; and
wherein the support is received between the forward lip and the rearward lip below the body.

25. The wheel chock assembly of claim 17 wherein the wedge portion comprises assembled plates having engaged tabs and openings.

26. A wheel chock comprising:
a base;
a sensor to detect a proximity of a wheel;
a wedge portion above the base supporting the sensor;
a plurality of assembled plates of the wedge portion; and
engaged protrusions and openings of the assembled plates of the wedge portion to transfer loading between the plates of the wedge portion.

27. The wheel chock of claim 26 wherein the assembled plates include sidewall plates upstanding from the base and having edge surface portions to engage the wheel, the sidewall plates configured to transfer load vertically from the sidewall plates to the base.

28. The wheel chock of claim 26 wherein the assembled plates include:

sidewall plates having edge surface portions to engage the wheel; and at least one transverse plate extending between the sidewall plates and having a surface to face the wheel.

29. The wheel chock of claim 28 wherein the at least one transverse plate includes a lower surface portion extending at a first angle relative to the base and an upper surface portion extending from the lower surface portion at a second angle relative to the base different than the first angle.

30. The wheel chock of claim 29 wherein the second angle is in a range of approximately 20 to approximately 25 degrees relative to the base.

31. The wheel chock of claim 28 wherein the at least one transverse plate includes a plurality of plates that extend transversely to one another.

32. The wheel chock of claim 26 wherein the assembled plates include sidewall plates having edge surface portions to engage the wheel; and wherein the sidewall plates and the base include the engaged protrusions and openings.

33. The wheel chock of claim 26 wherein the engaged protrusions and openings include tabs and openings.

34. The wheel chock of claim 26 wherein the wedge portion includes welds connecting the assembled plates.

35. The wheel chock of claim 26 further comprising a support removably connected to the base, the support comprising a plurality of teeth to engage a surface adjacent the wheel.

* * * * *